US009424549B2

(12) United States Patent
Jones et al.

(10) Patent No.: US 9,424,549 B2
(45) Date of Patent: Aug. 23, 2016

(54) SYSTEM AND METHOD FOR FACILITATING USER-GENERATED CONTENT RELATING TO SOCIAL NETWORKS

(75) Inventors: Quentin John Jones, New Brunswick, NJ (US); Stephen Ricken, Cranford, NJ (US); Nathaniel Douglas Laws, Whippany, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 12/757,515

(22) Filed: Apr. 9, 2010

(65) Prior Publication Data
US 2010/0262916 A1 Oct. 14, 2010

Related U.S. Application Data

(60) Provisional application No. 61/168,050, filed on Apr. 9, 2009.

(51) Int. Cl.
G06F 3/048 (2013.01)
G06F 15/16 (2006.01)
G06F 17/30 (2006.01)
G06Q 10/10 (2012.01)

(52) U.S. Cl.
CPC .................................... *G06Q 10/10* (2013.01)

(58) Field of Classification Search
USPC ........... 709/207; 717/101; 455/416; 705/319; 706/25
See application file for complete search history.

(56) References Cited

U.S. PATENT DOCUMENTS

| | | | |
|---|---|---|---|
| 6,832,245 B1 | 12/2004 | Isaacs et al. | |
| 2002/0161732 A1* | 10/2002 | Hopp et al. | 706/25 |
| 2005/0216300 A1* | 9/2005 | Appelman et al. | 705/1 |
| 2006/0026256 A1* | 2/2006 | Diddee et al. | 709/207 |
| 2006/0271381 A1* | 11/2006 | Pui | 705/1 |
| 2007/0226679 A1* | 9/2007 | Jayamohan et al. | 717/101 |
| 2007/0282791 A1* | 12/2007 | Amzalag | G06Q 10/10 |
| 2008/0064019 A1* | 3/2008 | Kaufman | G09B 7/00 434/350 |
| 2009/0142742 A1* | 6/2009 | Goldberg | G09B 7/02 434/362 |
| 2009/0186605 A1* | 7/2009 | Apfel et al. | 455/416 |
| 2010/0088246 A1* | 4/2010 | Lim | 705/319 |

OTHER PUBLICATIONS

McCarty, et al., Eliciting Representative Samples of Personal Networks, Social Networks, 19, pp. 303-323, 1997.

(Continued)

*Primary Examiner* — Tuan S Nguyen
(74) *Attorney, Agent, or Firm* — McCarter & English, LLP

(57) ABSTRACT

A system and method for facilitating user-generated content relating to social networks are provided. The system provides an online environment which poses questions to users, and which allows the users to answer such questions by identifying appropriate contacts of the user. The system automatically identifies the user's contacts by consulting one or more electronic accounts of the user on one or more social networking sites/services, and/or one or more e-mail accounts. The user can respond to questions posed by clicking on appropriate contacts, dragging them, and dropping them in an answer area in the online environment. The user can manage his/her contacts by creating one or more groups and/or tags associated with each contact. The grouped/tagged contacts can be imported into a contact management system, and can be used by researchers to conduct social network visualizations or to achieve other research objectives.

21 Claims, 26 Drawing Sheets

(56) References Cited

OTHER PUBLICATIONS

McCarty, Structure in Personal Networks (Measuring Structure in Personal Networks), Journal of Social Structure, 3:1, 2002.

Fu, et al., Measuring Pwersonal Networks With Daily Contact: A Single-Item Survey Question and the Contact Diary, Social Networks, 27, pp. 169-186, 2005.

Kim, et al., Configurations of Relationships in Different Media: FtF, Email, Instant Messenger, Mobile Phone, and SMS, Journal of Computer-Mediated Communication, 12, pp. 1183-1207, 2007.

Ellison, et al., The Benefits of Facebook "Friends:" Social Capital and College Students' Use of Online Social Network Sites, Journal of Computer-Mediated Communication, 12, pp. 1143-1168, 2007.

* cited by examiner

FIG. 9

| | |
|---|---|
| 5 | Sukeshini Grandhi |
| 4 | David Busch<br>Roxanne Hiltz<br>Sandeepa M. Datta<br>Nathaniel Laws |
| 3 | Quentin (Gad) Jones |
| 2 | Celine Dion<br>Mohammed Ismail |
| 1 | Nina Jeffries |

SYSTEM AND METHOD FOR FACILITATING USER-GENERATED CONTENT RELATING TO SOCIAL NETWORKS

RELATED APPLICATIONS

The present disclosure claims the benefit of U.S. Provisional Patent Application Ser. No. 61/168,050 filed Apr. 9, 2009, the entire disclosure of which is expressly incorporated herein by reference.

STATEMENT REGARDING FEDERALLY SPONSORED RESEARCH

The present invention was made with government support under Grant Number ILS-0534520 awarded by the National Science Foundation. The government has certain rights in this invention.

BACKGROUND

1. Technical Field

The present disclosure relates generally to the fields of social networking, data mining, and social computing. More specifically, the present disclosure relates to a system and method for facilitating user-generated content relating to social networks.

2. Related Art

Market researchers, organizational psychologists, sociologists and application developers all have an interest in mapping social networks and social structures of individuals, groups, organizations, institutions and communities. Such data can be utilized to provide online and mobile services, engender social and organizational change, market products and services, and assist with research. Collecting such data is a major challenge with serious limitations existing in current methods.

Existing methods do not provide a simple way to derive the relationship between an individual's contact list on one or more social networking sites and the user's offline social ties. Standard pen and paper tools used by sociologists to map an individual's social network either provide comprehensive, detailed information about a small number of ties, or a small amount of information about a large number social ties. Also, these tools tend to be extremely time consuming for those being surveyed. Interpersonal communication data can be mined to provide information about organizational structures, contacts, and social networks. However, data mining techniques by themselves are limited by the representativeness of the data samples (e.g., they might just contain work e-mail addresses) and the ability to map the connection between communication pattern samples and real world social ties and structures.

It is known to provide web-based user interfaces for allowing users to tag content using user-defined tags. For example, the "gwap" system (http://www.gwap.com/) allows users to play online games which involve each user creating user-defined tags to describe an image. When the users agree on tags, points are awarded. The tags created by the users can then be used to improve future searches for content by search engines.

A major difficulty with the foregoing approaches is that it is too time consuming for subjects to first identify and then answer a significant number of questions about each of their social ties within a particular environment. Also, existing techniques do not allow for systematic, detailed modeling of the relationship between an individual or community's use of physical space and social structures. The present disclosure provides solutions to these problems.

SUMMARY

The present disclosure relates to a system and method for facilitating user-generated content relating to social networks. In one embodiment, the present disclosure provides a system for facilitating user-generated content relating to social connections, comprising: a local computer system operated by a user; a central server in communication with the local computer system, the central server receiving at least one question to be posed to the user; means at the central server for creating a master list of contacts of the user; means at the central server for generating at least one user interface screen which includes the at least one question to be posed to the user and the master list of contacts; means for transmitting the at least one user interface screen for display by the local computer system, the user responding to the at least one question using the at least one user interface screen by identifying one or more contacts from a list of contacts in response to the at least one question; and a database for storing content generated by the user using the user interface, the content relating to one or more of the contacts of the users. A plurality of questions can be asked of the user, and the user's responses tracked and processed to provide a rich visualization of one or more of the user's social networks.

In another embodiment, the present disclosure provides a method for facilitating user-generated content relating to social networks. The method comprises the steps of: receiving at a computer system at least one question to be posed to a user; creating at the computer system a master list of contacts of the user; generating at least one user interface screen which includes the at least one question to be posed to the user and the master list of contacts; displaying the at least one user interface screen to the user; allowing the user to respond to the at least one question using the at least one user interface screen by identifying one or more contacts from a list of contacts in response to the at least one question; allowing the user to generate content relating to one or more of the contacts using the user interface; and storing the content in a database.

In another embodiment, the present disclosure provides a computer readable storage medium comprising computer-readable instructions for instructing at least one computer system to generate a computerized environment for facilitating user-generated content relating to social networks. The instructions cause at least one computer system to execute the steps comprising: receiving at the at least one computer system at least one question to be posed to a user; creating at the at least one computer system a master list of contacts of the user; generating at least one user interface screen which includes the at least one question to be posed to the user and the master list of contacts; displaying the at least one user interface screen to the user; allowing the user to respond to the at least one question using the at least one user interface screen by identifying one or more contacts from a list of contacts in response to the at least one question; allowing the user to generate content relating to one or more of the contacts using the user interface; and storing the content in a database.

BRIEF DESCRIPTION OF THE DRAWINGS

The foregoing features will be apparent from the following Detailed Description, taken in connection with the accompanying drawings, in which:

FIGS. 8-26 are screenshots showing the user interface of the system of the present disclosure.

DETAILED DESCRIPTION

The present disclosure relates to a system and method for facilitating user-generated content relating to social networks, as discussed in detail below in connection with FIGS. 1-26.

Before describing the present disclosure in detail, some definitions are provided as follows:

The term "contacts" refers to an acquaintance, colleague, or relative to whom a person relates, with whom the person communicates, or whom the person knows.

The term "social network" refers to a set of people, organizations, or other social entities connected by a set of social relationships, such as friendship, co-working, or information exchange.

The term "social network visualization" means a representation of a social network made of nodes, which are individuals or organizations with edges or links between them.

The term "social networking site" or "social networking website" mean a web-based service that allows individuals to: (1) construct a public or semi-public profile within a bounded system; (2) articulate a list of other users with whom they share a connection; and (3) view and traverse their list of connections and those made by others within the system.

The term "social networking service" means a social networking site or social networking website (as both are defined above), and/or an e-mail communication service.

The term "social desktop" refers to a 2-dimensional or 3-dimensional space in which users can place icons or avatars that represent contacts, groups, or organization and through which they can organize a social network visualization.

The term "edge" refers to a connection between two contacts represented in a social network visualization.

The term "node" means individuals or organizations with edges or links between them.

The term "social network analysis" refers to the process of understanding patterns of relations among people, organizations, states, etc.

The term "social structure" means entities of groups in definite relation to each other or relative patterns of behavior and relationship within a society or social group.

The term "social computing" means the use of computing applications which connect users to each other and which support interpersonal communication (e.g., Instant Messaging), social navigation (e.g., Facebook), and/or data sharing (e.g., flickr.com).

Figure 1:
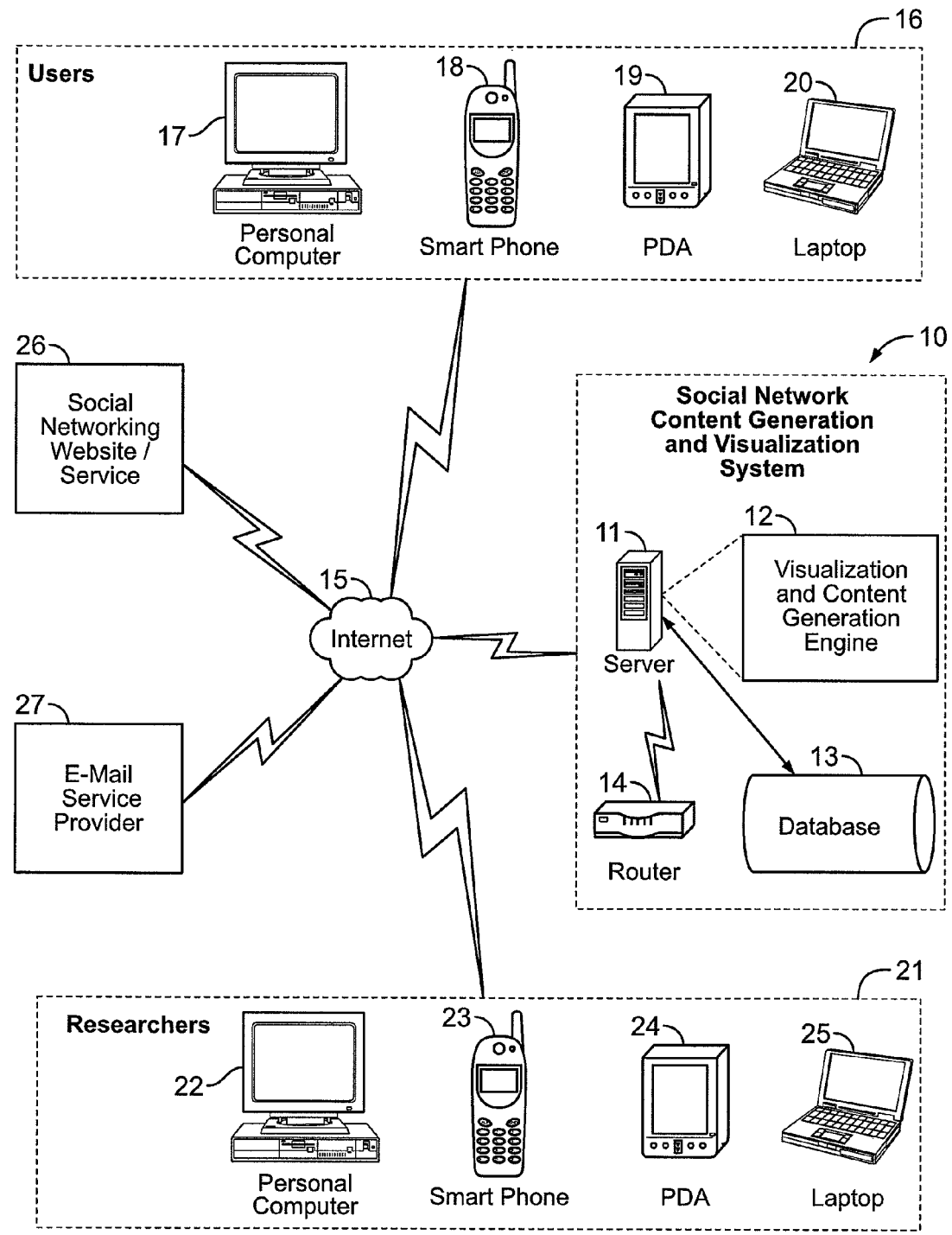
FIG. 1 is a diagram showing the system of the present disclosure.

Turning now to the drawings, FIG. 1 is a diagram showing the system 10 of the present disclosure, which facilitates the generation, visualization, and management of user-defined content relating to one or more social networks of users 16. As discussed below in greater detail, the system 10 provides a rich, easy-to-use user interface accessible via the Internet 15, in which content (data) relating to social networks can be generated, visualized, and managed. Also, the system 10 permits researchers 21 to conduct research regarding social networks of the users 16. The system 10 is in communication with the Internet 15 (e.g., via router 14 or any other type of communications and/or security device), and includes a research server 11. The system of the present disclosure could be embodied as a social connection content generation and visualization software engine 12 which generates the user interface of the present disclosure, allows the users 16 to generate content relating to social networks of the users 16 (e.g., tags and/or groups created by the users 16 which relate to one or more contacts of the social networks of the users 16), and processes and mines information about social networks of the users 16 so that contacts can be organized and managed, and so that research about user behavior with respect to social networks, as well as visualization of such networks, can be conducted. Social network data mined by the server 11 is stored in a database 13. The server 11 could be any suitable type of computing device having any desired type of hardware architecture, such as a server manufactured by Sun Microsystems, Inc. and having the SPARC hardware architecture, or any other suitable device/architecture. Moreover, the server 11 could be distributed across one or more computing devices, each of which could have a single or multiple processors and/or single or multiple processor cores. Still further, the server 11 could execute any suitable computer operating system, such as UNIX, Solaris, Linux, Microsoft Windows, etc., without departing from the spirit or scope of the present disclosure. The research engine 12 could be coded in any suitable high- and/or low-level computing languages, such as Java, C, C++, C#, .NET, Perl, HTML, XML, PHP, etc., and/or various combinations thereof. Also, the research database 13 could comprise any suitable relational database management system, such a MySQL, Oracle, etc. It is further noted that the engine 12 and database 13 need not execute in an Internet-enabled environment, but rather, could be installed and executed on a local device, such as the user's devices 17-20 discussed below.

The users 16 are in communication with the system 10 via the Internet 15, and operate one or more computing devices capable of executing a web browser, such as a personal computer 17, a smart phone 18 (e.g., a Blackberry smart phone, Apple iPhone, etc.), a personal digital assistant (PDA) 19, and/or a laptop 20. The devices 17-20 could communicate with the Internet using wired and/or wireless networking devices (e.g., 3G/4G cellular network, WiFi, Ethernet, etc.). Similarly, the researchers 21 communicate with the system 10 via the Internet 15, using one or more computing devices such as a personal computer 22, a smart phone 23, PDA 24, and/or laptop 25.

As will be discussed in greater detail below, the system 10 provides a user interface (or, environment) in which the users 16 to generate, visualize, and manage content relating to social networks, as well as to participate in research relating to the users' social networks. Specifically, the system 10 provides an environment wherein the users 16 are provided with lists of contacts (people) that the user knows (which could be automatically generated by the system 10 by retrieving contact information from one or more social networking websites/services 26 and/or one or more e-mail service providers 27), and wherein the users 16 can group and/or organize such contacts using a graphical, drag-and-drop interface. Further, the users 16 can respond to one or more research questions prepared by the researchers 21. Advantageously, the grouped/organized contacts can be exported from the system 10 to the social networking website/service 26 and/or the e-mail service provider 27, thereby providing a useful contact management tool for the users 16. It is noted that the services/service providers 26, 27 could comprise AOL Instant Messenger (AIM), Google Talk (GTalk), Yahoo Messenger, IRC, an e-mail communication service, or any other social networking tool which permits people to communicate with each other and which maintains a list of contacts defined by each user. Further, it is noted that the present invention could be integrated as part of (on the same computing systems as) the services/service providers 26, 27, and need not exist in a separate computing system.

Data about the users' behavior while using the user interface, as well as the contact groupings made by the users and the users' answers to various questions, are stored in the database 13. The stored (mined) information can then be accessed by the researchers 21 for analyzing users' behavior while using social networks, performing statistical analysis on the mined data, or for other research purposes. The information can be exported into a desired format (e.g., text file, database file, spreadsheet, etc.), and transmitted to the researchers 21. The system 10 allows for guided social network model creation by prompting users with a series of questions. When answered, the questions result in a rich, well-structured social visualization that maps real-world social ties or structures. Further, it is noted that the information gathered by the present invention could be processed by social science software applications, e.g., statistical packages such as SPSS or SAS.

Figure 2:
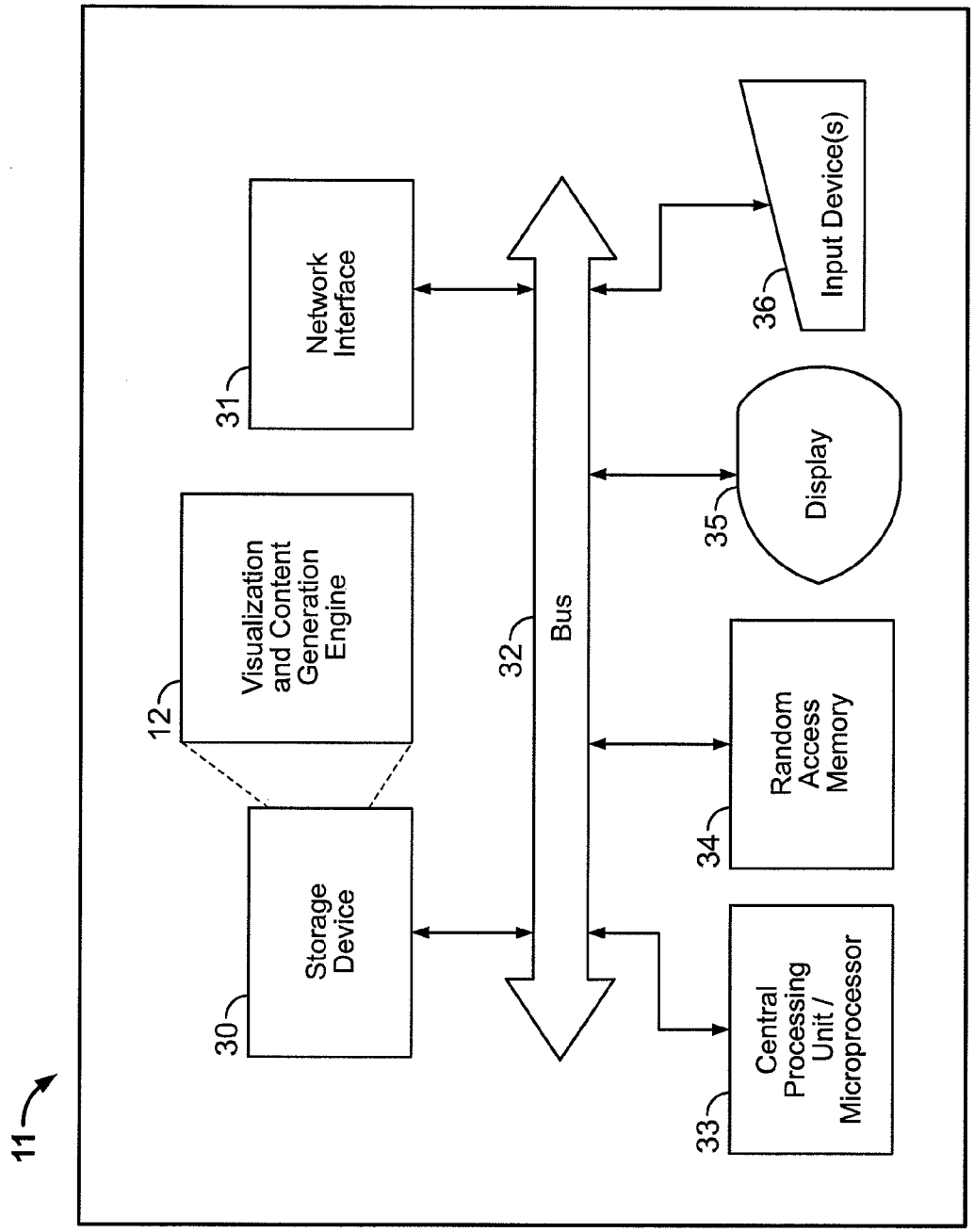
FIG. 2 is a diagram showing hardware and software/firmware components of the system of the present disclosure in greater detail.

FIG. 2 is a diagram showing hardware and software/firmware components of the system 11 of FIG. 1, in greater detail. The system 11 includes a storage device 30 which stores the research engine 12, a network interface 31, a bus 32, a central processing unit (CPU)/microprocessor 33, a random access memory 34, a display 35, and one or more input devices 36 (e.g., keyboard, mouse, etc.). The storage device 30 comprises any suitable, non-volatile, computer-readable storage medium, such as disk, flash memory, ROM, EPROM, EEPROM, etc. The CPU 33 executes the content generation and visualization engine engine 12, which, when executed, causes the server 11 to perform the functions disclosed herein. Of course, it is noted that the engine 12 could be executed across multiple computing systems, such as a cloud computing environment. Further, the engine 12 could be stored on and executed on a local, stand-alone computer system. The CPU 33 could be a single-core or multiple-core microprocessor.

It is noted that the system of the present disclosure need not be separate from a social networking service. Rather, it could be provided as part of such a service. For example, the system of the present disclosure could be seamlessly integrated into a social networking website, into an e-mail communication system, or as part of a larger contact management system/service. In such circumstances, the system of the present disclosure would have direct access to user contacts, thereby obviating the need to import such contacts and/or export content generated by the user and relating to such contacts.

Figure 3:
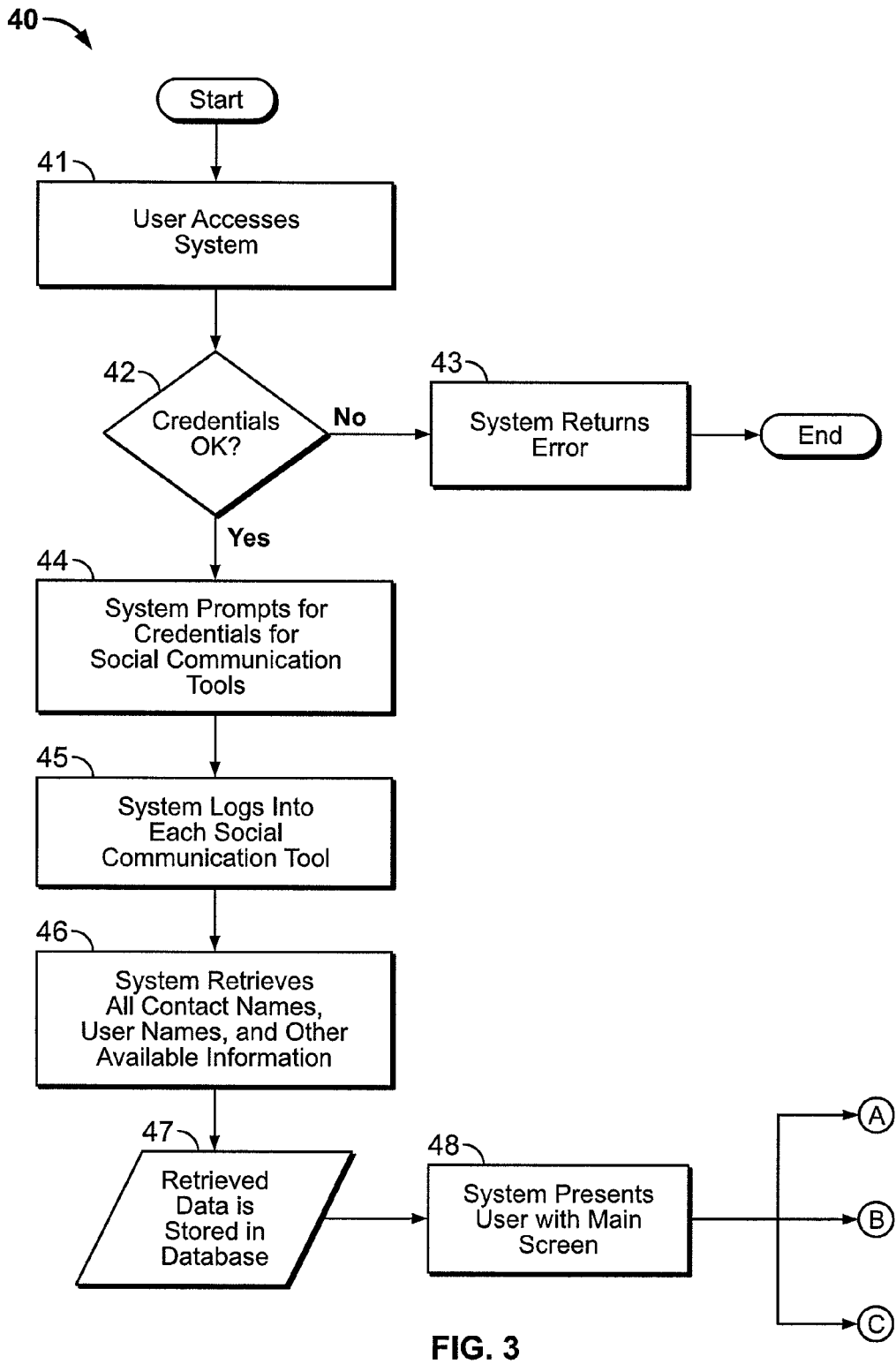
FIGS. 3-7 are flowcharts showing processing steps carried out of the system of the present disclosure.

FIG. 3 is a flowchart showing processing steps, indicated generally at 40, carried out by the system of the present disclosure. Beginning in step 40, a user of the system (e.g., one or more of the users 16 of FIG. 1) accesses the system using a conventional web browser, and provides credentials (e.g., user name and password). In step 42, a determination is made as to whether the credentials are acceptable. If a negative determination is made, step 43 occurs, wherein the system returns an error message to the user, and processing halts. Otherwise, step 44 occurs, wherein the system prompts the user for credentials relating to social communication tools. For example, the user could be prompted to provide a login and password for one or more social networking sites that the user utilizes (such as the social networking website/service 26 of FIG. 1), and/or a login and password for one or more e-mail accounts utilized by the user (e.g., an account stored on and/or operated by the e-mail service provider 27 of FIG. 1, such as a Google e-mail (gmail) account).

Once the supplied credentials have been provided, step 45 occurs, wherein the system logs into each social communication tool using the credentials supplied by the user. Then, in step 46, the system retrieves all contact names, user names, and/or other available information from each social communication tool. For example, in the case of an e-mail account, the system obtains each contact name stored in the e-mail account; in the case of a social networking service (such as AOL Instant Messenger), the system obtains each user name associated with the user's account (e.g., from the user's "buddy" list). Further, the user could define his or her own list of contacts using the user interface of the present invention, or the list of contacts could be generated from some other source, such as a family tree, diary, log of contacts, etc. The system processes all contacts and compiles a single, master contact list that is displayed to the user in the user interface, as shown and described below in connection with FIGS. 8-9. Once the information has been obtained, step 47 occurs, wherein the retrieved data is stored in a database, such as the database 13 of FIG. 1. In step 48, the user is presented with a main user interface screen, which allows the user to perform one or more desired actions as discussed in detail below in connection with FIGS. 4-6.

Figure 4:
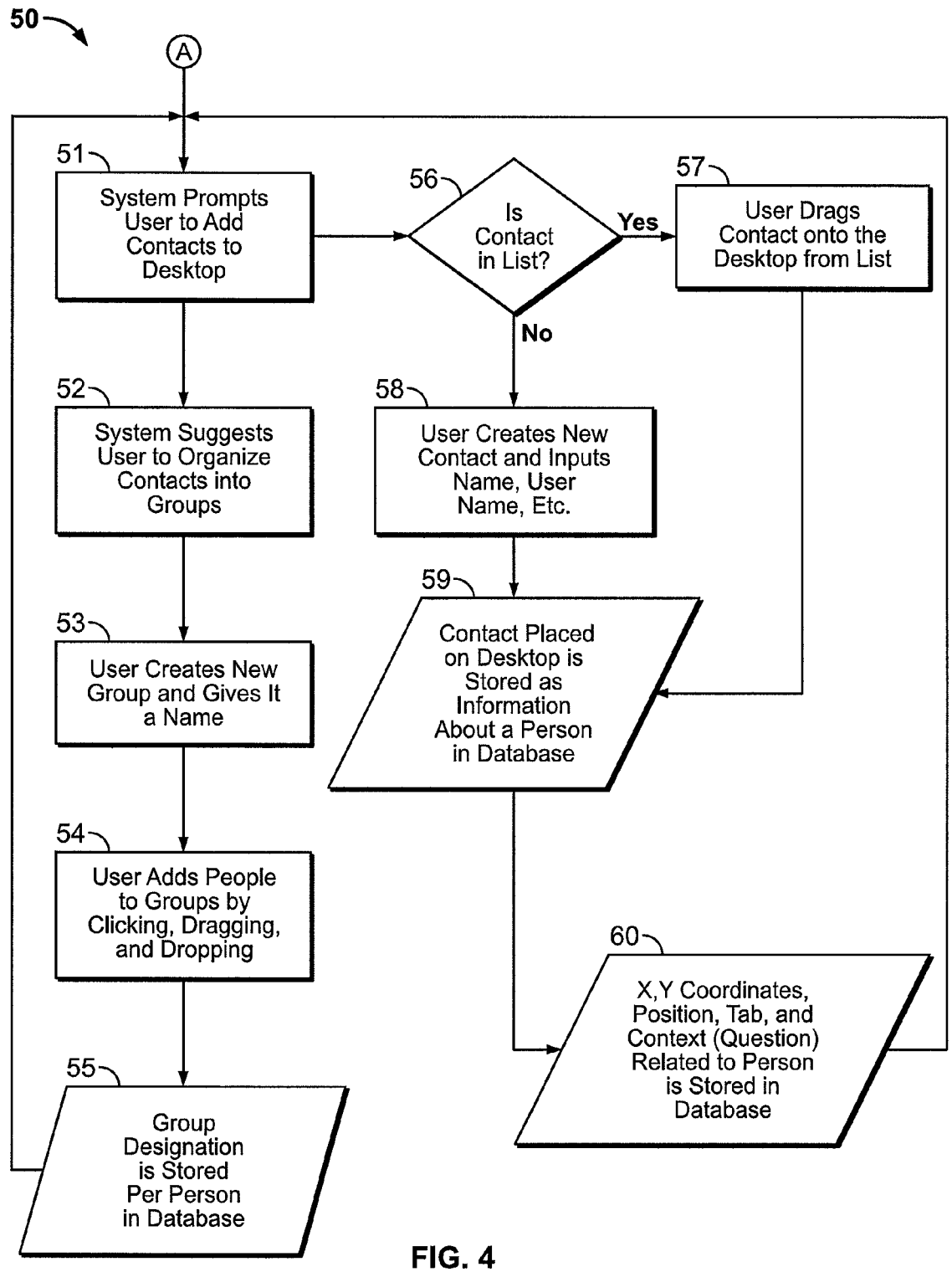

FIG. 4 is a flowchart showing processing steps according to the system of the present disclosure, indicated generally at 50, which allow the user to organize his or her contacts using a drag-and-drop, web-based interface. In step 51, the system prompts the user to add a desired contact to a "desktop" in the interface, by clicking on the master list of contacts, dragging desired contacts to the desktop, and dropping them onto the desktop (using a computer mouse). In step 52, the system suggests to the user how to organize contacts into one or more groups. For example, the system could suggest that the user group a plurality of contacts based upon types of recreational activities that the user engages in with the contacts. In response to the suggestion, in step 53, the user creates a new group and gives it a name, using the user interface. The group is displayed in the user interface screen by an appropriate icon, such as the icons shown and discussed hereinbelow. Then, in step 54, the user adds contacts (people) to the group by clicking on each contact, dragging it on top of the group icon, and drops it on the icon (using a computer mouse). In step 55, the group and group designations made by the user are stored in the database, on a per-person (per-contact) basis. Processing is then repeated so that additional contacts can be managed and groups created, if desired.

After step 51, step 56 also occurs, wherein a determination is made as to whether a desired contact is in the master contact list. If a positive determination is made, step 57 occurs, wherein the user drags the contact onto the desktop from the master contact list. Otherwise, step 58 occurs, wherein the user creates a new contact and inputs the contact's name, user name, or any other desired information. In step 59, the contact is placed on the desktop and is stored as information about a person in the database. Then, in step 60, the X and Y pixel coordinates, as well as information about the current user interface screen tab, and a context (question) presented to the user, are stored in the database. Processing is then repeated so that additional contacts can be managed and groups created, if desired.

Figure 5:
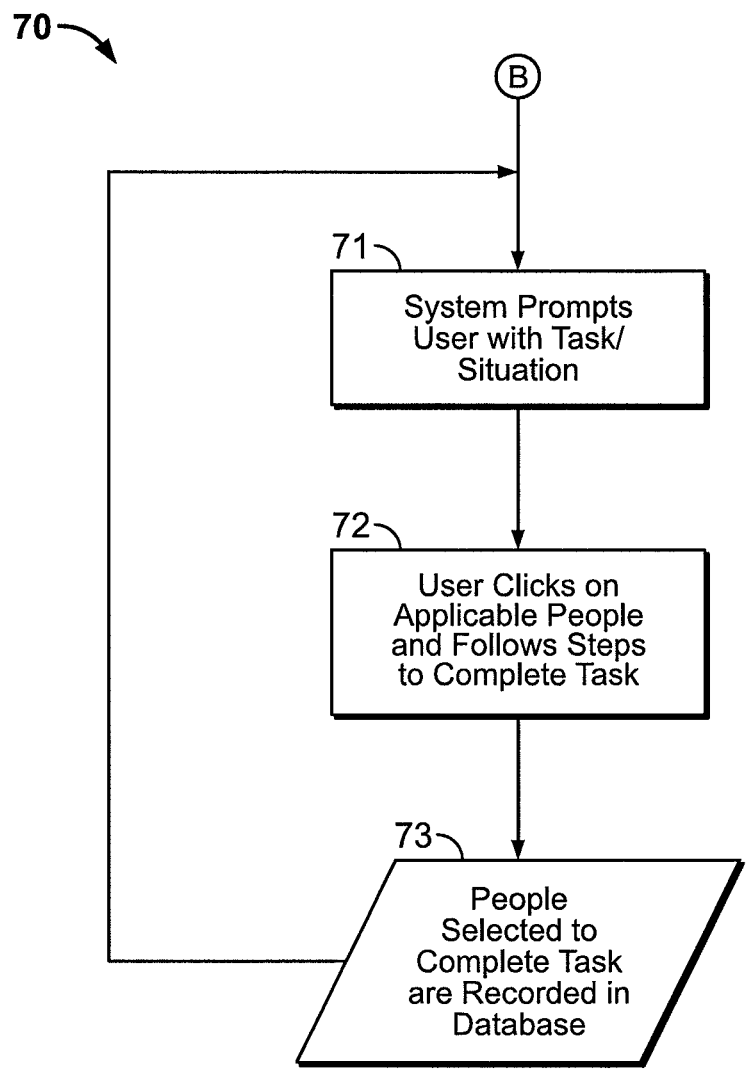

FIG. 5 is a flowchart showing processing steps implemented by the system of the present disclosure, indicated generally at 70, for posing a task/situation to a user of a social network and for allowing the user to carry out tasks in response to the situation. In step 71, the system presents the situation to the user in the form of one or more questions and/or tasks to be completed, which are displayed in the user interface generated by the system. Such questions and/or tasks could be pre-determined by a researcher or other of the system of the present disclosure. Also, the task/situation could represent an actual past or present task/situation involving the user, and/or a hypothetical task/situation. Then, in step 72, the user clicks one or more applicable people (contacts), and follows steps and/or performs tasks required by the situation. Then, in step 73, the system stores information in the database about the people selected by the user in response to the situation. Processing then repeats so that additional tasks/situations can be presented to the user, if desired.

Figure 6:
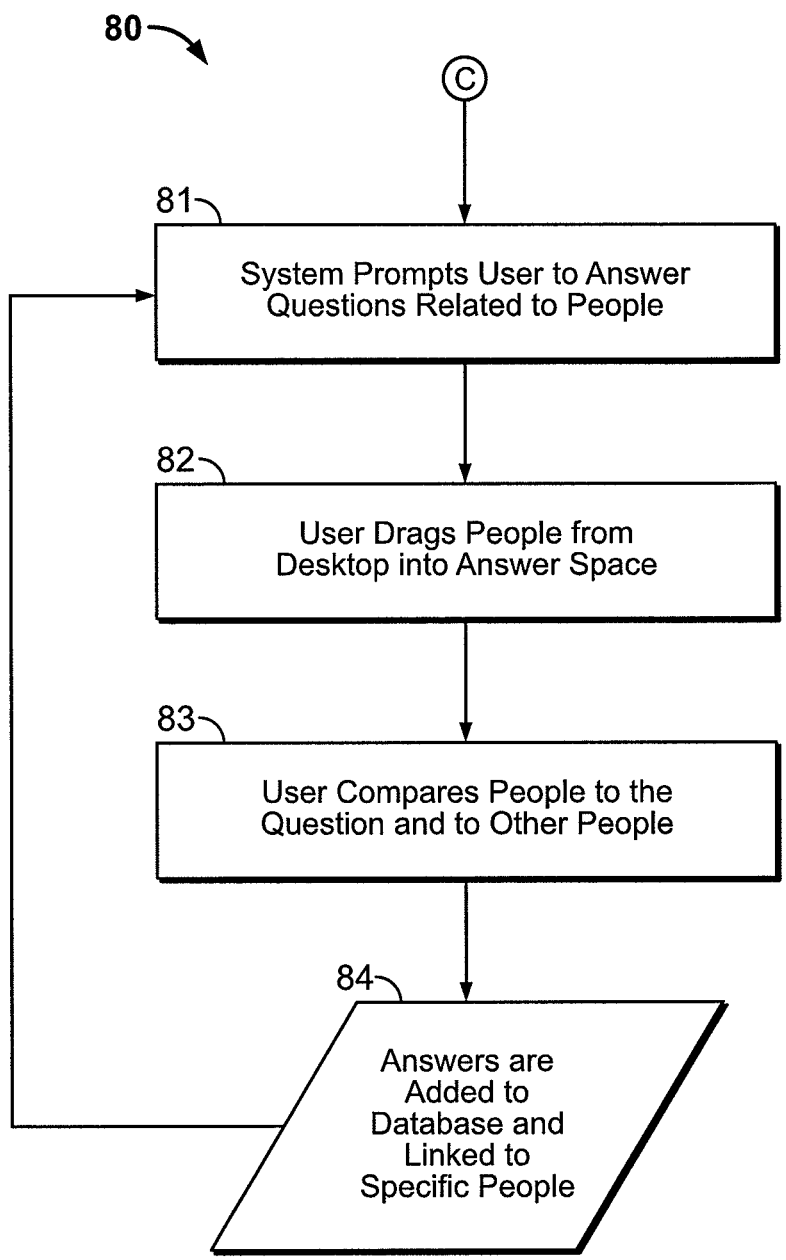

FIG. 6 is a flowchart showing processing steps carried out by the system of the present disclosure, indicated generally at 80, for allowing a user to answer various questions relating to users of a social networking tool. In step 81, the system prompts the user to answer questions relating to one or more people. Then, in step 82, the user answers the question by dragging people (contacts) from the desktop into an answer space that is displayed by the system in a region of the user interface screens. In step 83, the user compares people (contacts) to the question, as well as to other people, and answers the question by dragging one or more contacts from the master contact list and dropping the contacts on the answer area. In step 84, the answers are added to the database, and a linked to the specific people chosen in response to the question presented. Processing then repeats so that additional questions can be answered, if desired.

Figure 7:
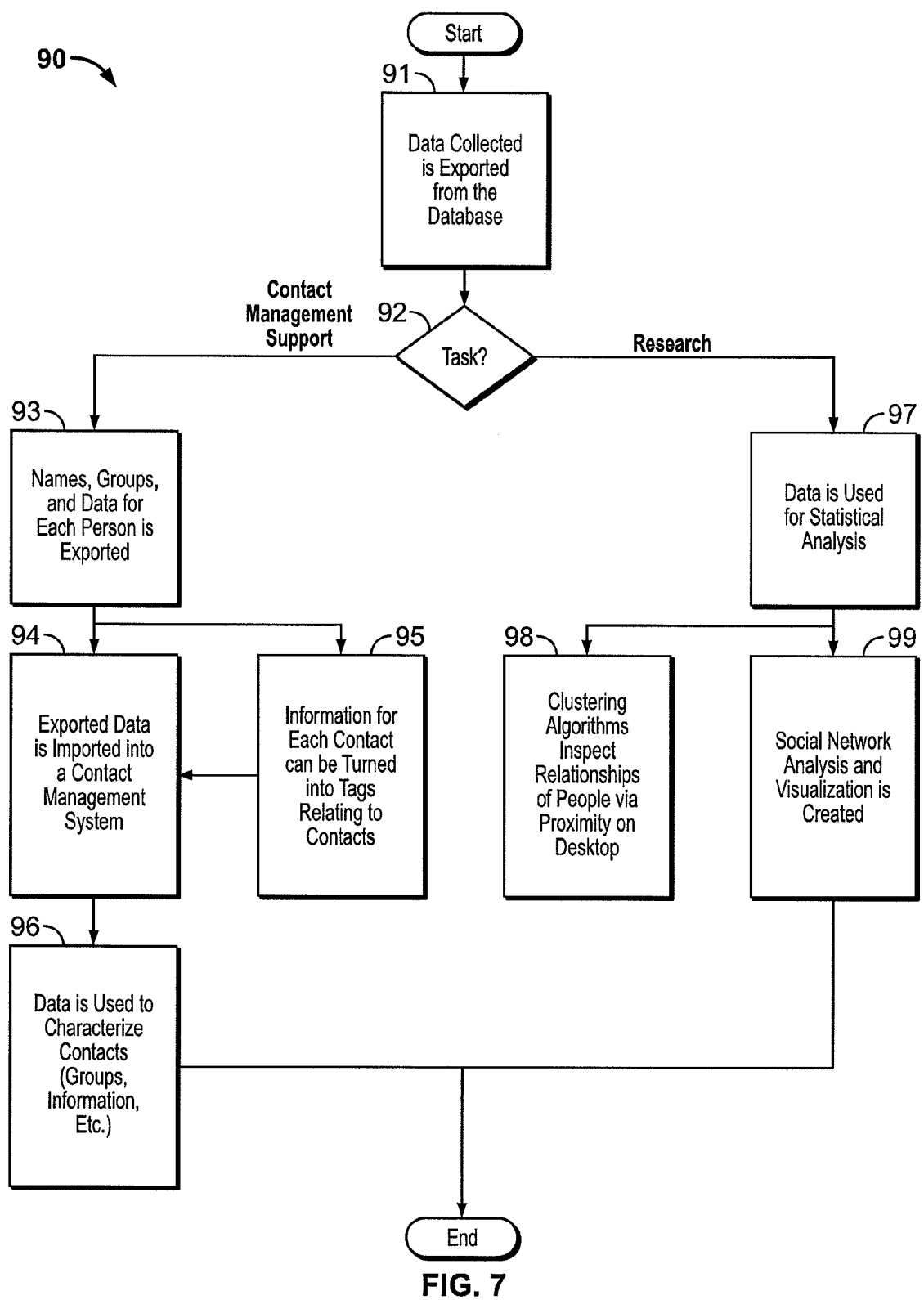

FIG. 7 is a flowchart showing processing steps implemented by the system of the present disclosure, indicated generally at 90, wherein information gathered by the system can be utilized to manage a user's contacts or utilized by a researcher to conduct research regarding social network users, behavior patterns, etc. In step 91, the data collected by the system of the present disclosure is exported from the database. Then, in step 92, a determination is made as to which task is to be performed. If the task is to support contact management, step 93 occurs, wherein names, groups, and data for each person (contact) processed by the system of the present disclosure is exported from the database. Then, in step 94, the exported data is imported into a contact management system, such as an e-mail contact manager, etc. Also, in step 95, information for each contact can be turned into "tags" relating to the contact. In step 96, the data can be used to characterize the person's contacts, such as according to groups to which various contacts have been assigned, specific information about the contacts, etc. The generation of tags and groups by the user, using the system of the present disclosure, thus allows the user to generate content relating to contacts of the user's social network(s). Such content can be used to characterize social networks, manage contacts, and/or perform research relating to social networks.

In step 92, if a determination is made that the task to be performed relates to a research task, step 97 occurs, wherein the information gathered by the system of the present disclosure can be used for statistical analysis purposes by a researcher. In step 98, one or more clustering algorithms can be applied to inspect relationships of people via their proximity in the desktop of the user interface. Also, in step 99, social network analysis and visualization can be created.

As mentioned above, the creation of social network visualizations begins by users placing contacts on a social desktop (or, within some other social visualization, such as a buddy list). To enable the contact placement actions, the user either manually enters contact information or selects contacts from a list presented by the system. The system-presented contact lists can be derived from the mining of a plurality of interpersonal communication. For contact placement, a guided survey can provide either a single social visualization user interface, present a number of alternative desktops where the user's contact placement reflects social relationships (e.g., a desktop for work, friends and family), or allow the user to create requisite number of social visualizations. The timing and relative position of the placement of the contacts on the visualization within the survey process is noted in order to track social structure. Users may also act on contacts on the visualization as a means to answering questions, for example to cluster contacts into different social groups by tagging, coloring, linking to a contact group or other related method, with the actions taken being noted by the system. Through the placement, positioning, and description process, contact tags are created which may or may not be viewed by the user.

It is also noted that the system of the present disclosure permits surveying a user about social structures based on a previously generated social visualization, including data from the desktop mentioned above. The user interface presents the user with his/her visualization of contacts, a question prompt, and an answer area. The system prompts questions to the user in order to obtain social structure data about contacts (e.g. "frequent mode of communication," "frequency of communication," "nature of relationship," "relational closeness," etc.), among other factors. Users answer the question prompts by interacting with their placed contacts. To answer a question, the user selects or manipulates the contacts that represent the embodiment of the question prompt. The data provided as answers may be displayed back to the user via tags. Within the survey context, a user may add additional contacts to their visualization if, in fact, a contact is deemed missing, but necessary to answer a question (e.g. a person's parents may not be originally in the visualization, so they add them at this point).

Figure 8:
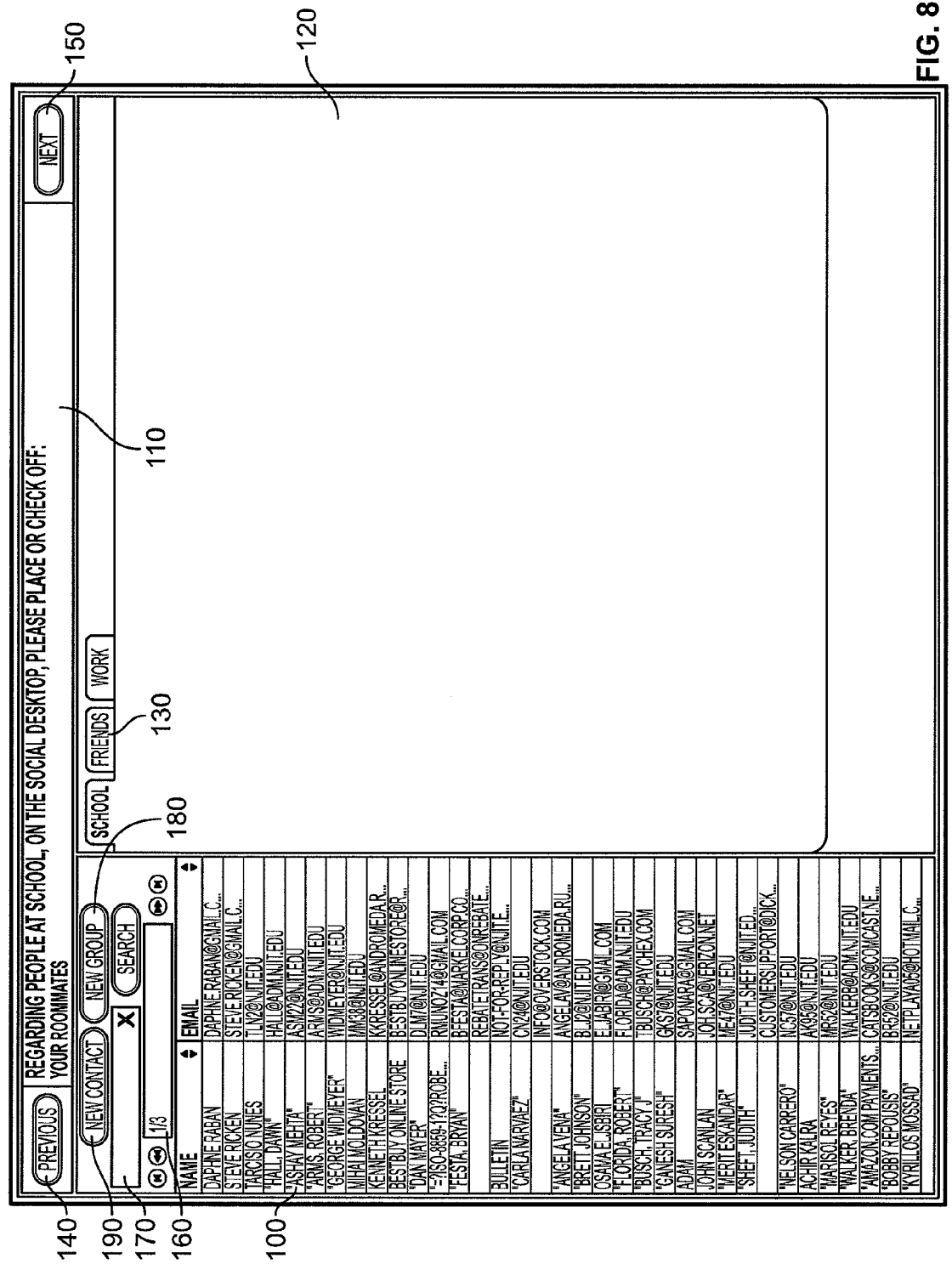

FIGS. 8-26 are screenshots showing the user interface generated by the system of the present disclosure. As shown in FIG. 8, a user is presented with a master list of contacts 100, a social desktop 120, and a question prompt area 110. The question presented to the user could relate, for example, to relationship context (e.g., friends that the user spends time with, people that the user has classes with, family that the user lives with). In order to answer each question, the user must place relevant contacts onto the desktop 120. The user may drag a contact from the contact list 100 to the desktop 120, or the user may manually create a contact by name and/or communication alias using the "New Contact" button 190. The user may place contacts where they feel comfortable, and may freely move contacts around the screen, much like the use of a windowed computer operating system desktop. The user may also separate sets of contacts using tabs 130. The tabs 130 enable multiple desktops for more contact space and placement freedom.

While viewing the contact list, the user may press screen button 160 to traverse forward and backward through the list of collected contacts. The user also has a search box 170 to narrow down his/her list. Once the user feels that he/she has answered the prompted question, the user pushes the "Next" button 150 to move to the next question. The user traverses forward and backward through the questions using buttons 140 and 150, adding more people to the desktop 120 for each question asked. At any point and time, the user can group contacts using the "New Group" button 180.

Figure 9:
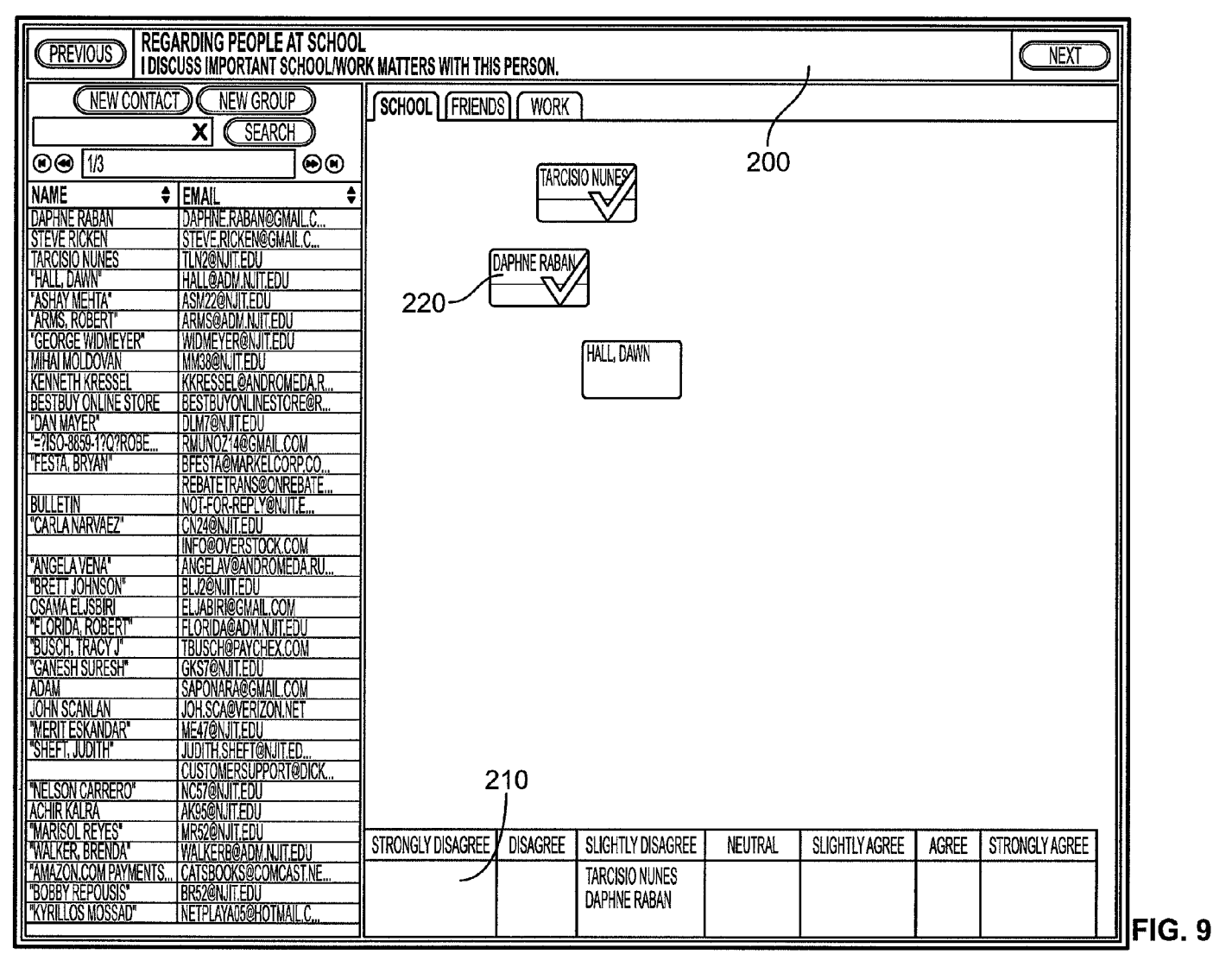

As shown in FIG. 9, the user is presented with a similar user interface as that shown in FIG. 8, with the addition of an answer box 210. A question 200 will prompt the user to characterize the contacts in the social visualization. Question types include binary response, scaled response, or a simple selection process. To answer the question, the user drags contacts from the social desktop into the answer box 210. The user can select multiple contacts and drag them all at once into the answer box 210, as well. Once in that box, a contact can be moved to different categories until the user is satisfied that the question is answered for that contact. The icon 220 indicates through a visual representation that differs from a normal contact (in this case, a checkmark and tinting effect is used) that a contact has been added to the answer bar, and may not be dragged there again for this specific question. Once a question is completed, the user moves on to the next question using the "Next" and "Previous" buttons, as in FIG. 8. The user may use the functionality discussed above in connection with FIG. 8 to add new contacts to the desktop if the user feels that a contact is missing and would answer a question more effectively.

Figure 10:
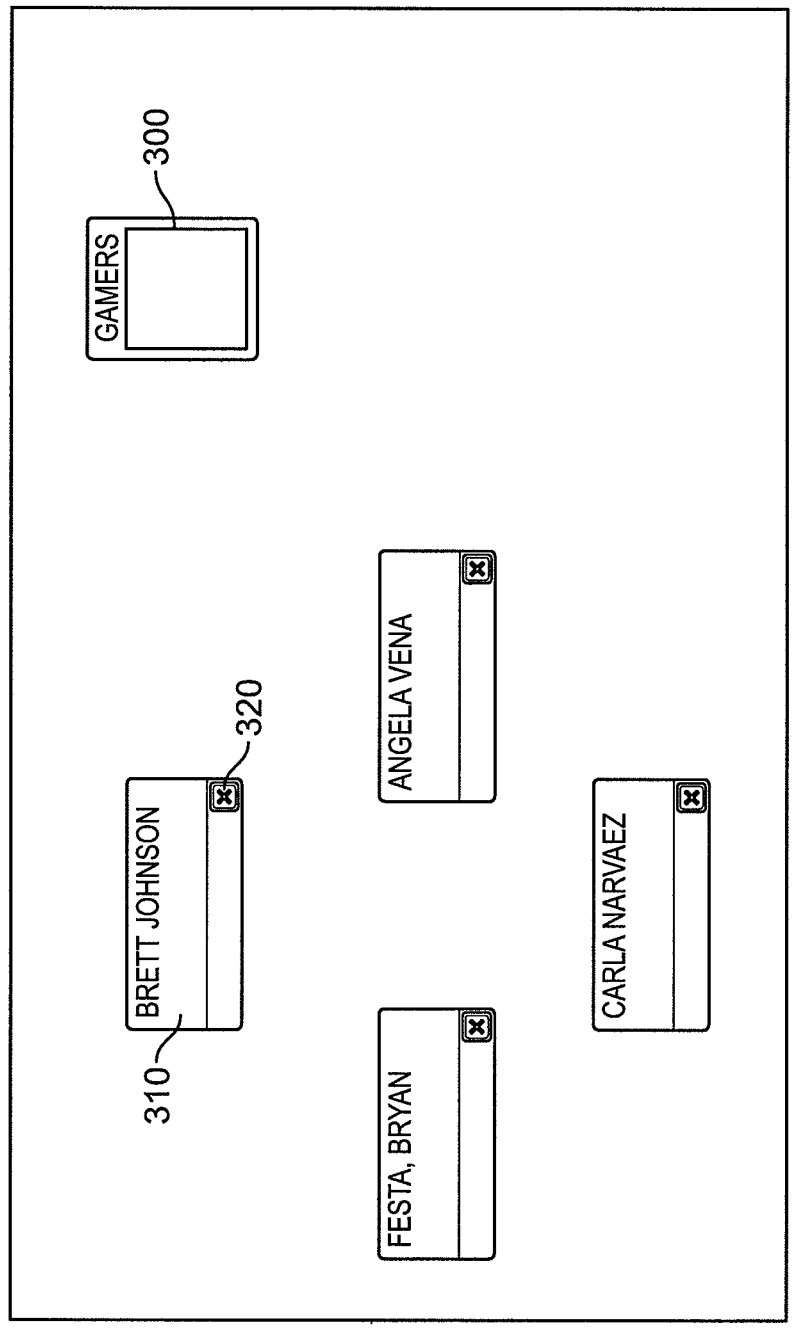

As shown in FIG. 10, the user interface of the system of the present disclosure provides users with the ability to group contacts by creating a "group" avatar/icon 300 and placing contacts into that group. To add a contact to a group, the user may drag contacts and drop them into the group or add through a menu choice. Group members 310 are highlighted using color or label flags 320 that coordinate with the group avatar/icon. Groups may be used for organizational purposes.

Figure 11:
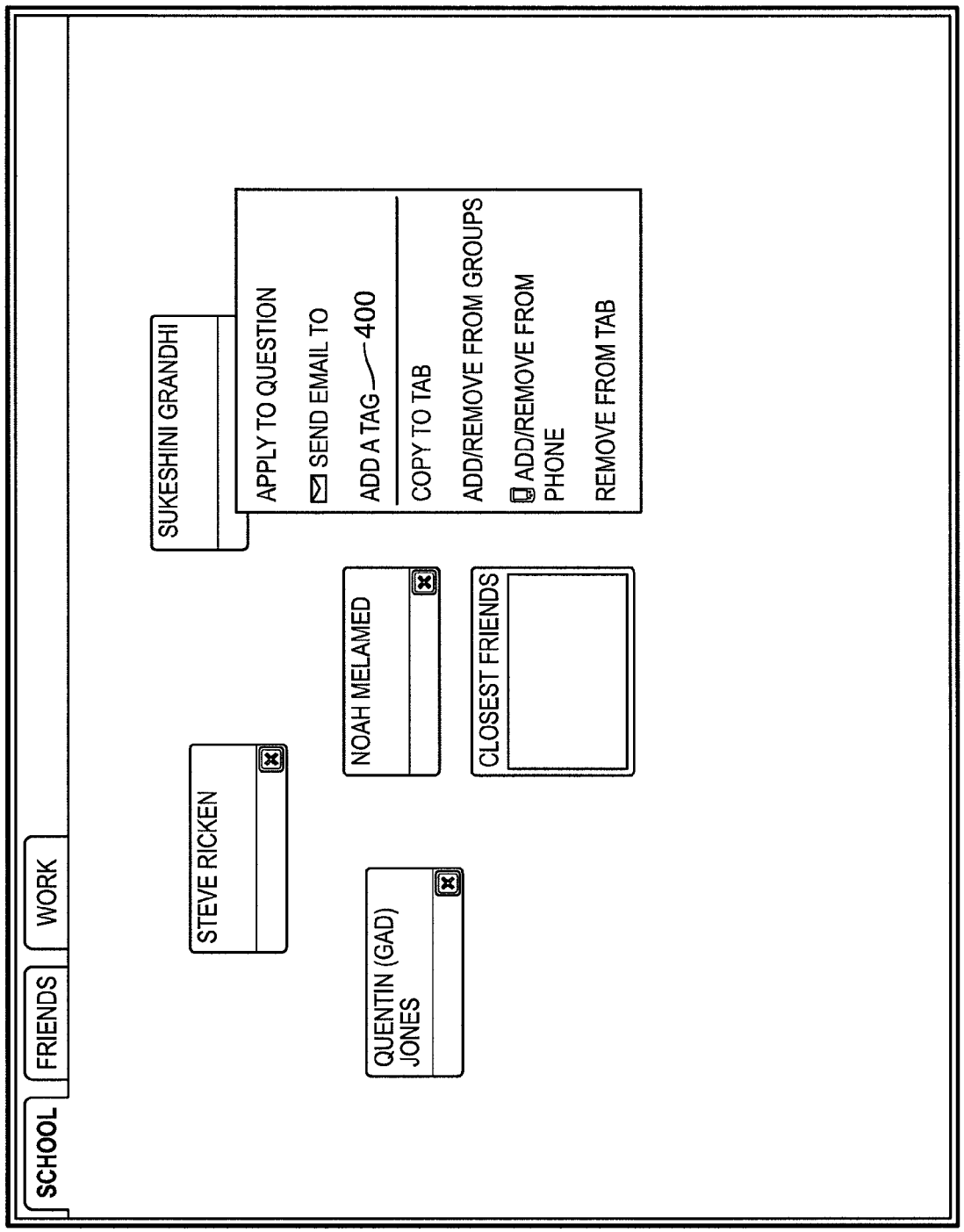
Figure 12:
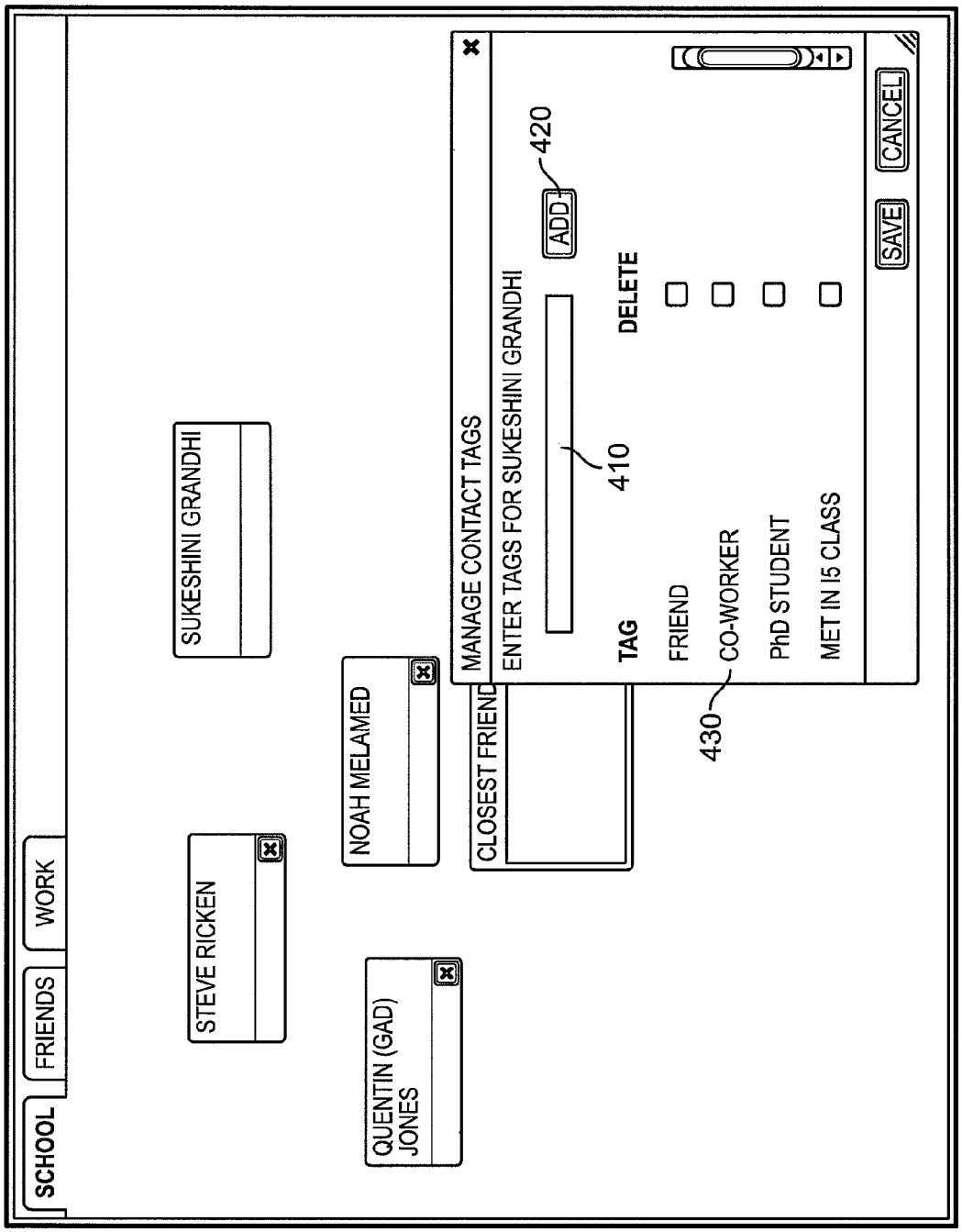

Some questions can also be answered using a tagging method shown in FIGS. 11-12. As shown in FIG. 11, selecting the "Add a tag" option 400 in the context menu for a contact brings the user to the screen shown in FIG. 12. As shown in FIG. 12, the user may enter a tag using the entry field 410 and click the "Add" button 420 to add it to the list of tags that represent that person. The tags are user-defined strings of text which describe the person. The list of tags pertaining to that person can be listed in screen area 430, and may be edited as well. These tags can be displayed on the user interface as well, or in user profiles of the contact.

As shown in FIG. 13, the system of the present disclosure permits a user to view survey results/answers to research questions using a color-coded view screen. Such a screen permits the user to distinguish not only the people who responded to each question, but also how they responded.

Figure 14:
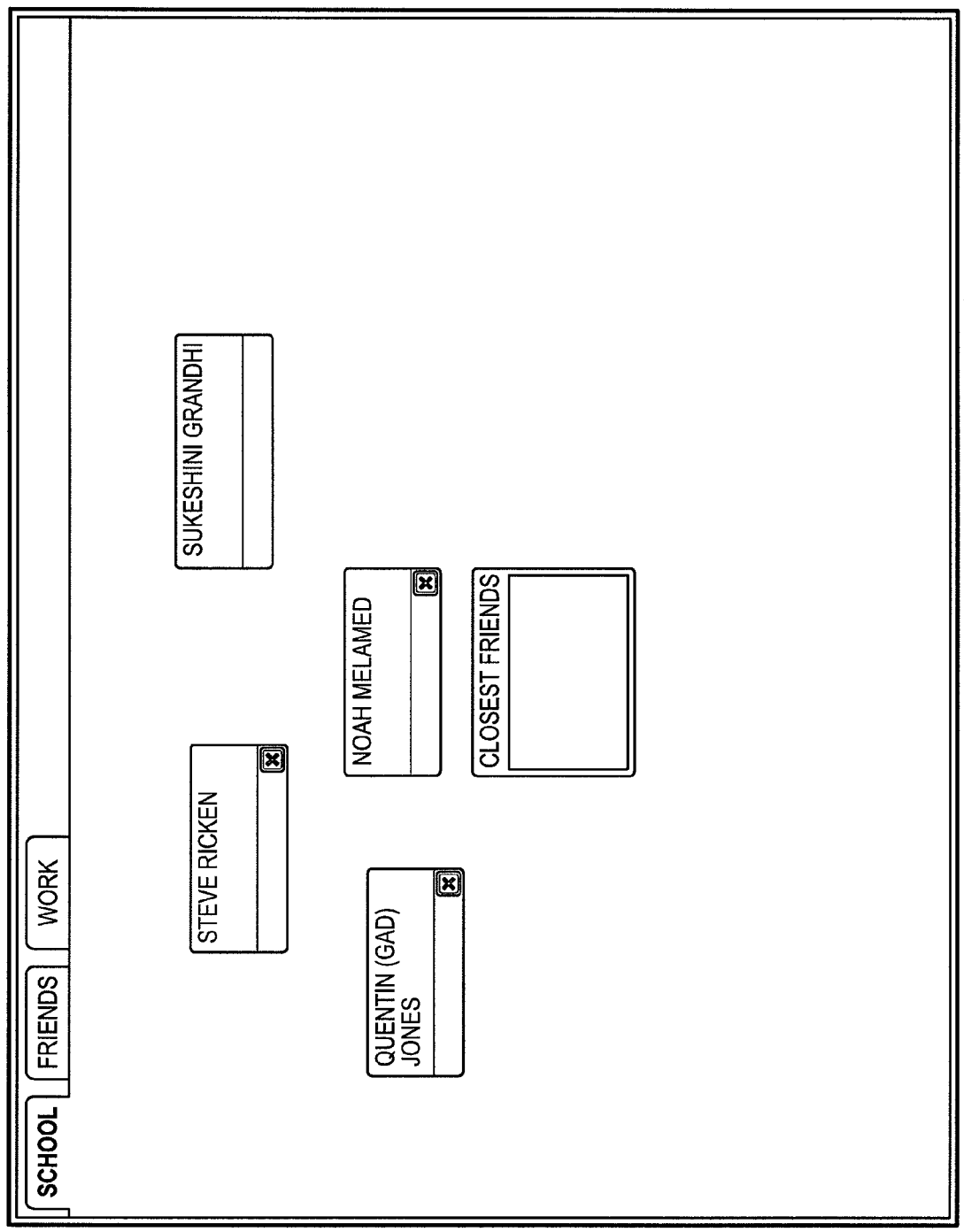
Figure 15:
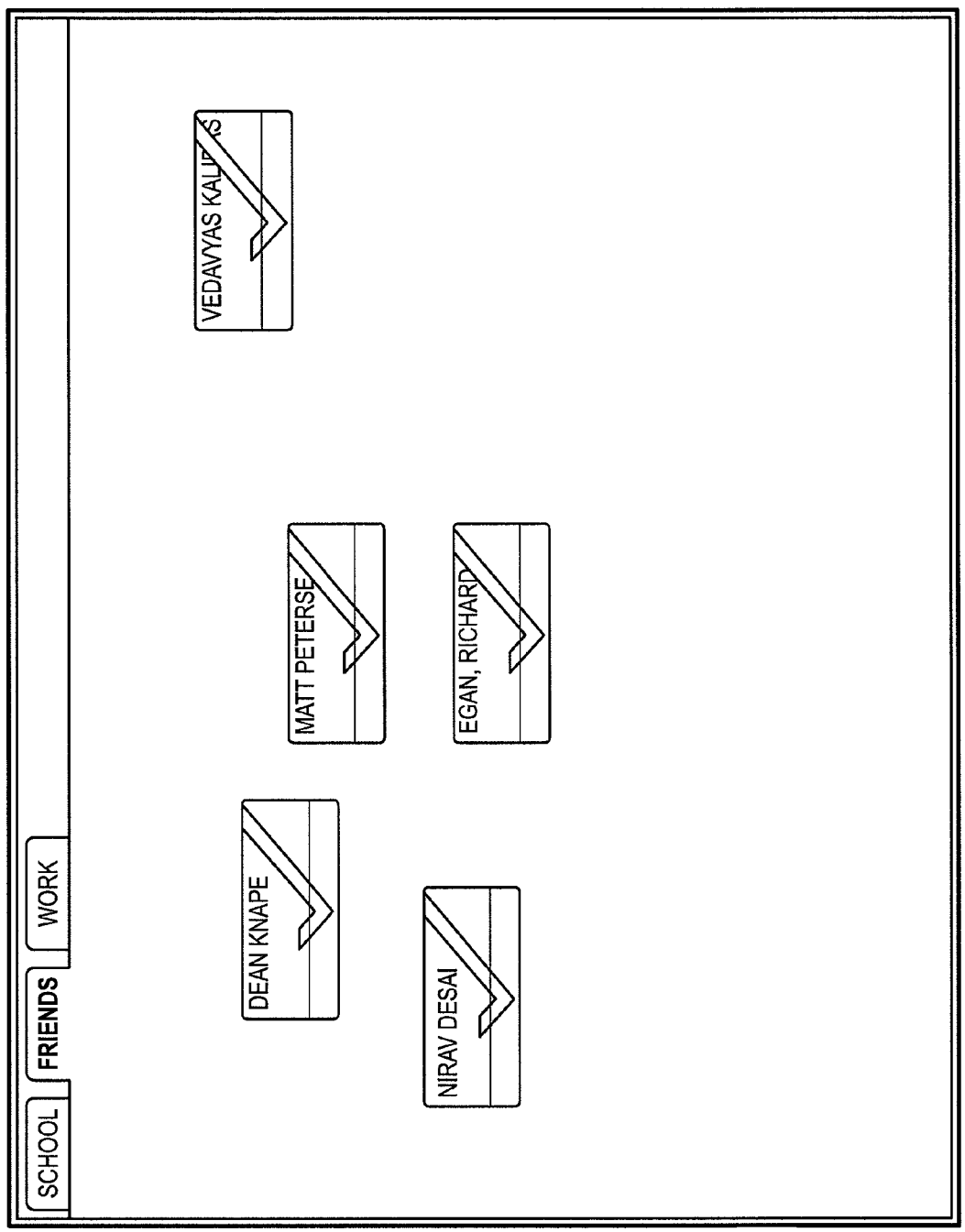
Figure 16:
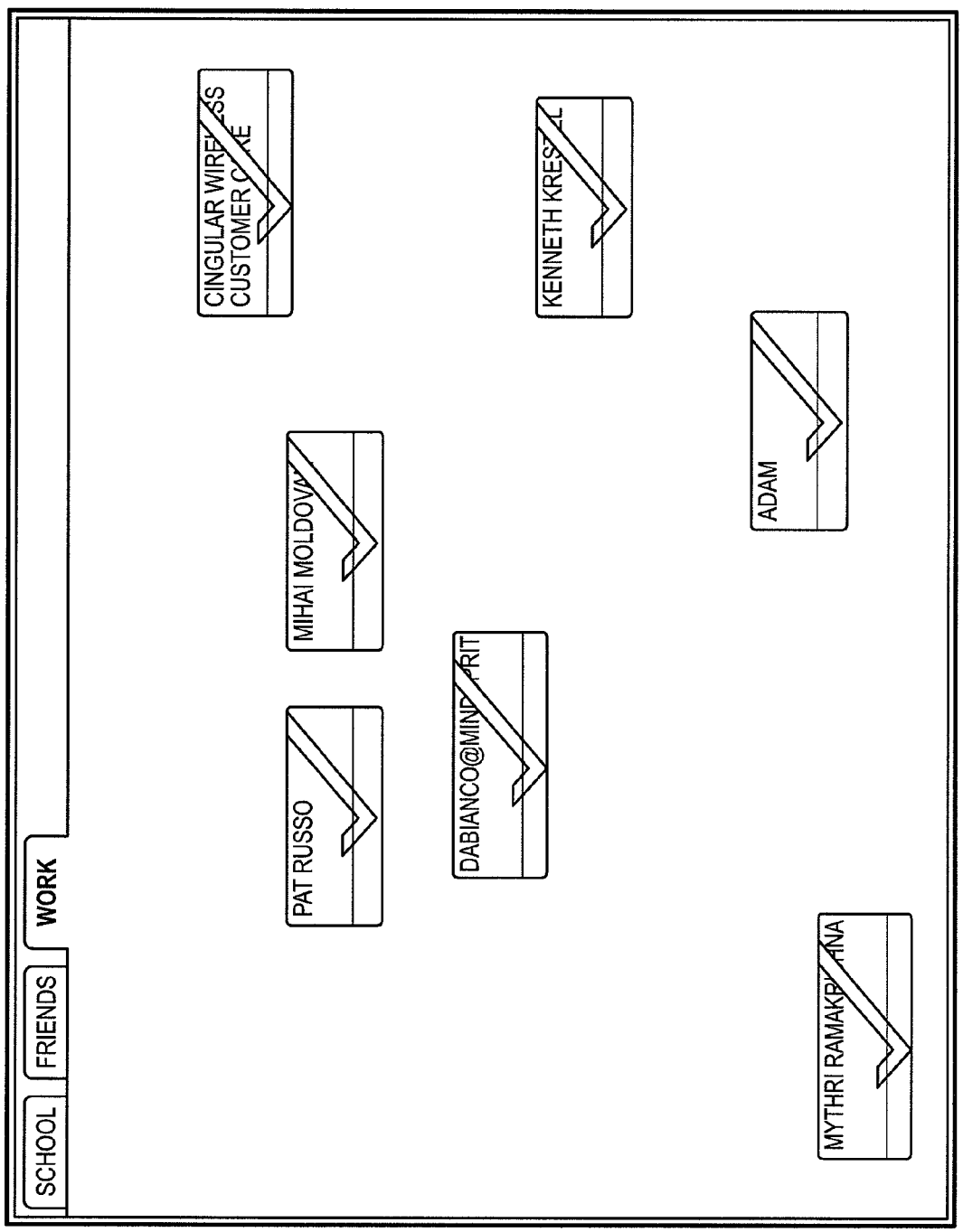

As shown in FIGS. 14-16, the tabs of the user interface of the present disclosure (discussed above in connection with FIG. 8) permit a user to further classify groups of people based upon any desired category. For example, as shown in FIG. 14, groups of people are displayed whom the user considers to be social contacts. As shown in FIG. 15, groups of people whom the user considers to be friends are displayed. As shown in FIG. 16, groups of people whom the user considers to be professional/work contacts are displayed. Any conceivable classification category can be utilized in connection with the tabs.

Figure 17:
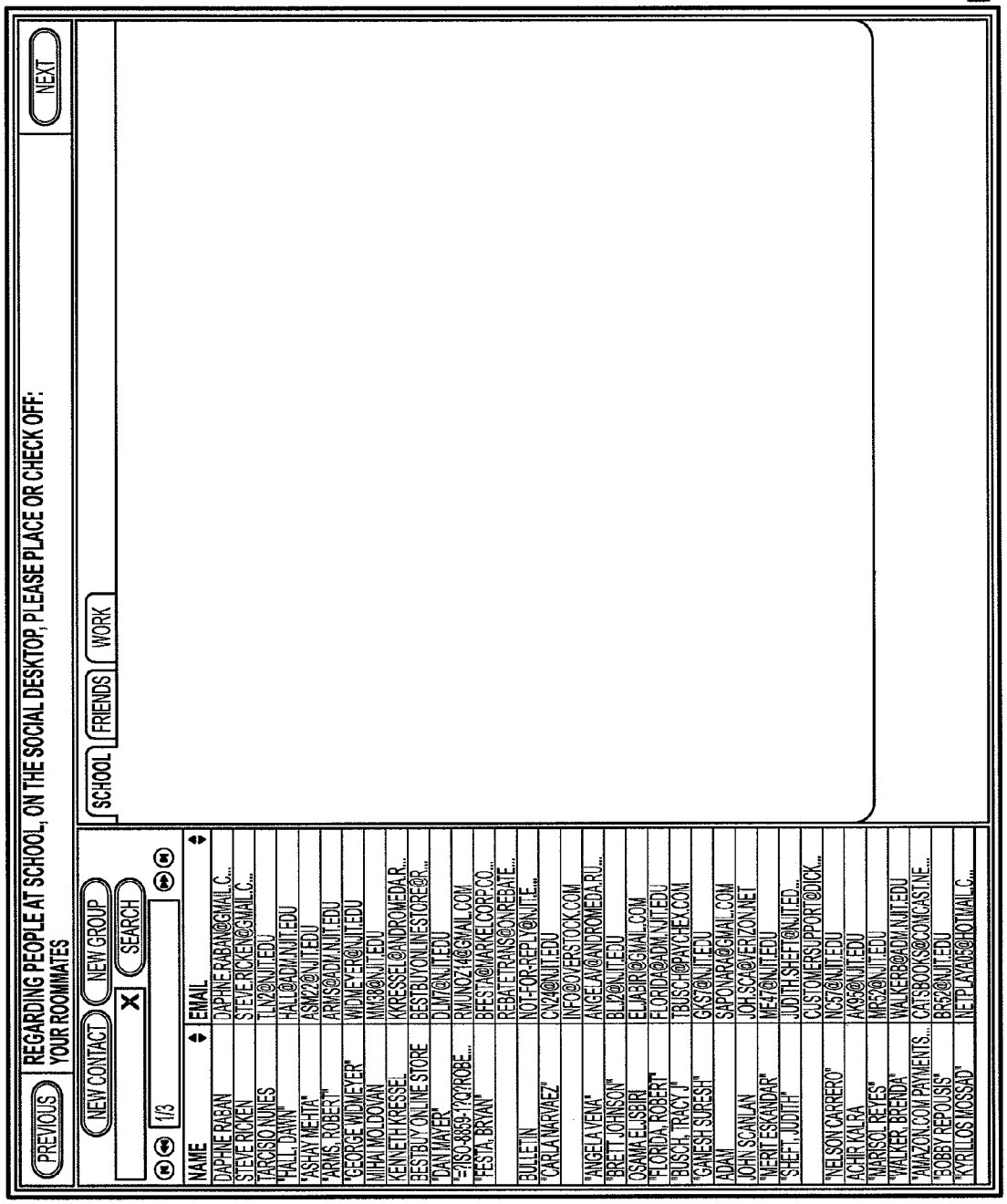
Figure 18:
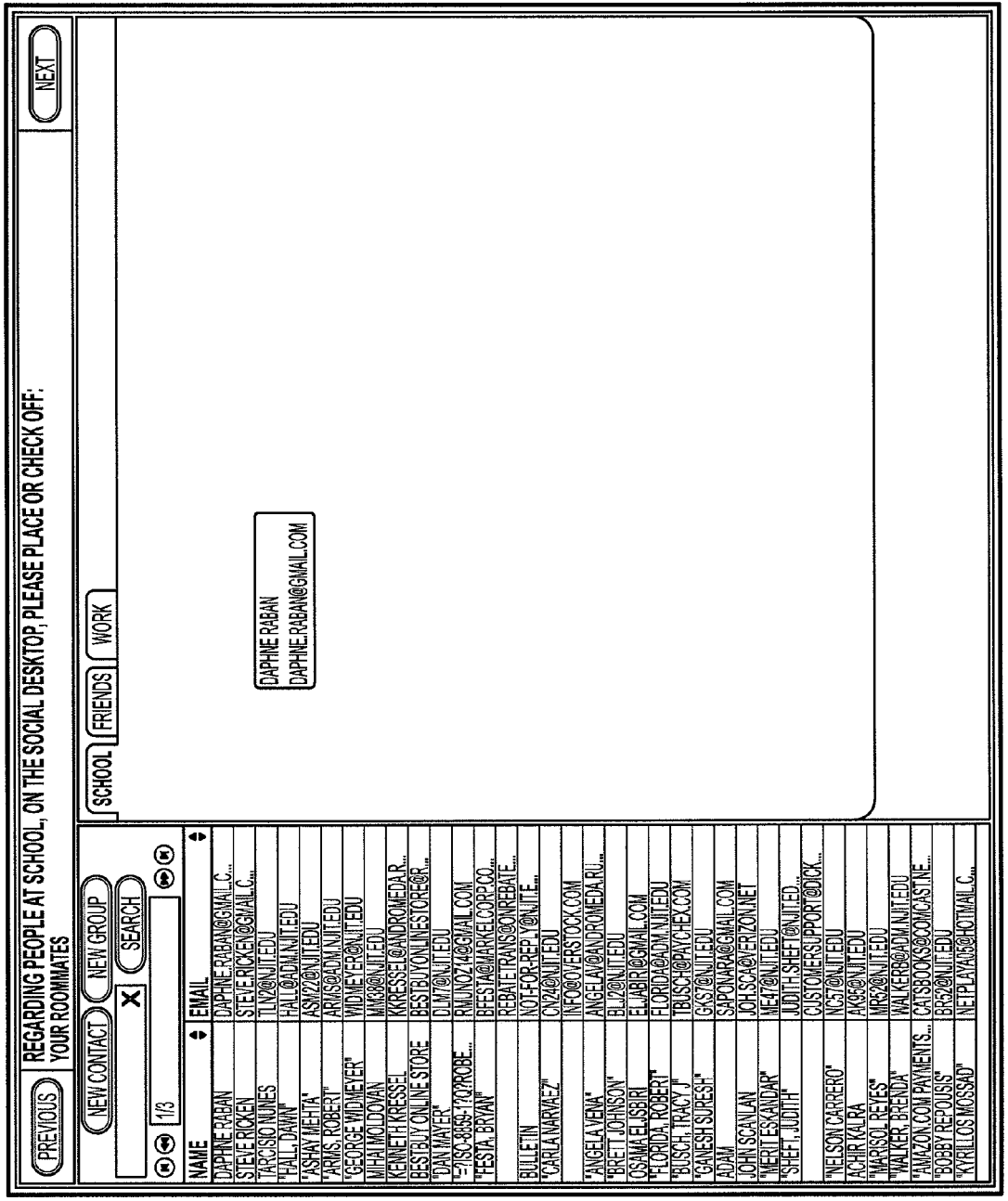
Figure 19:
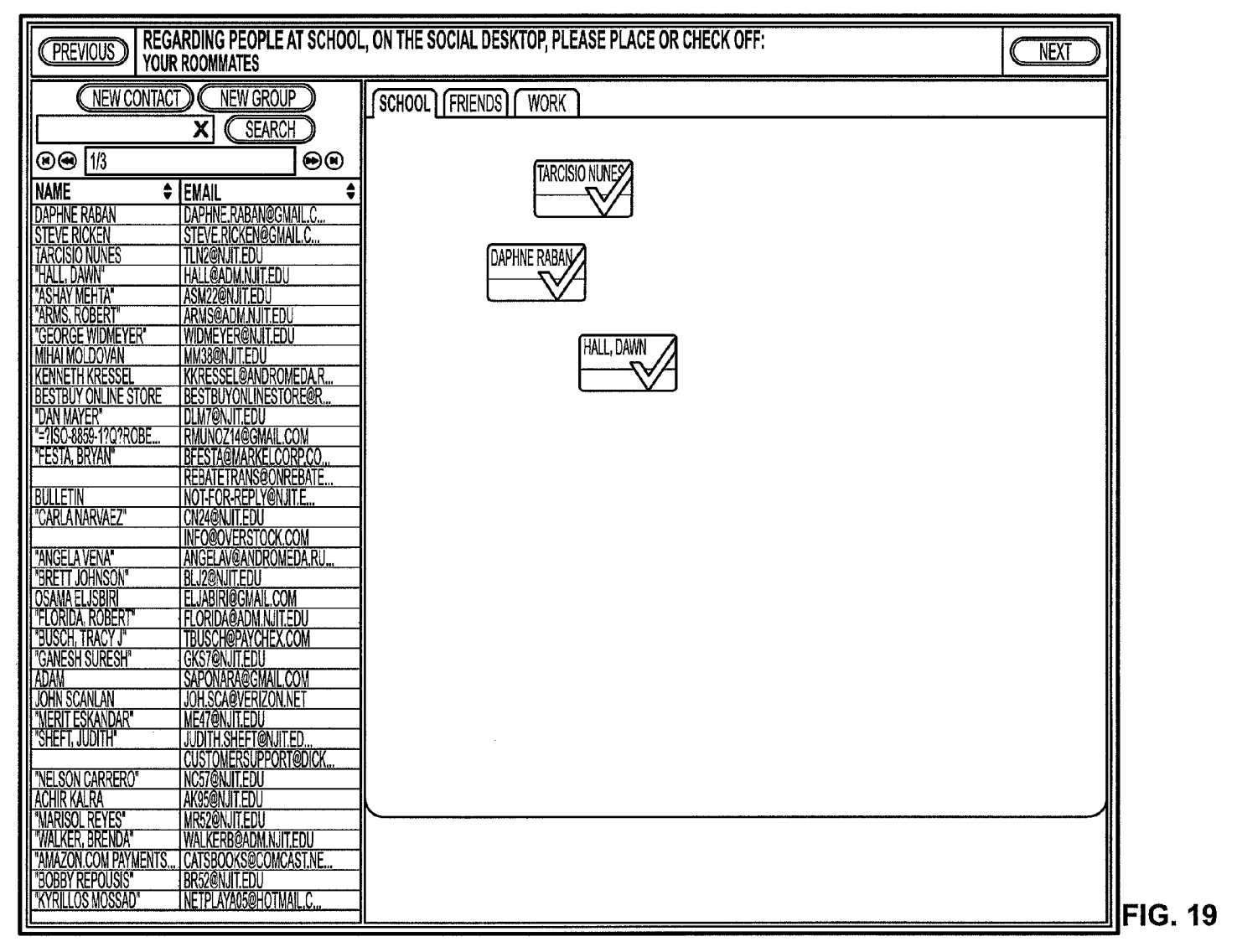

FIGS. 17-26 are screenshots showing the user interface of the present disclosure being utilized by a user to create a social network visualization and to answer specific questions posed by a researcher. As shown in FIG. 17, the user is initially provided with a blank desktop, a list of contacts, and a question asking the user to identify his/her roommates. As shown in FIG. 18, to answer the question, the user drags one or more contacts from the contact list to the desktop. As shown in FIG. 19, when the user drops the contacts onto the desktop, an checkmark icon appears, indicating that the contact has been selected by the user in response to the question.

Figure 20:
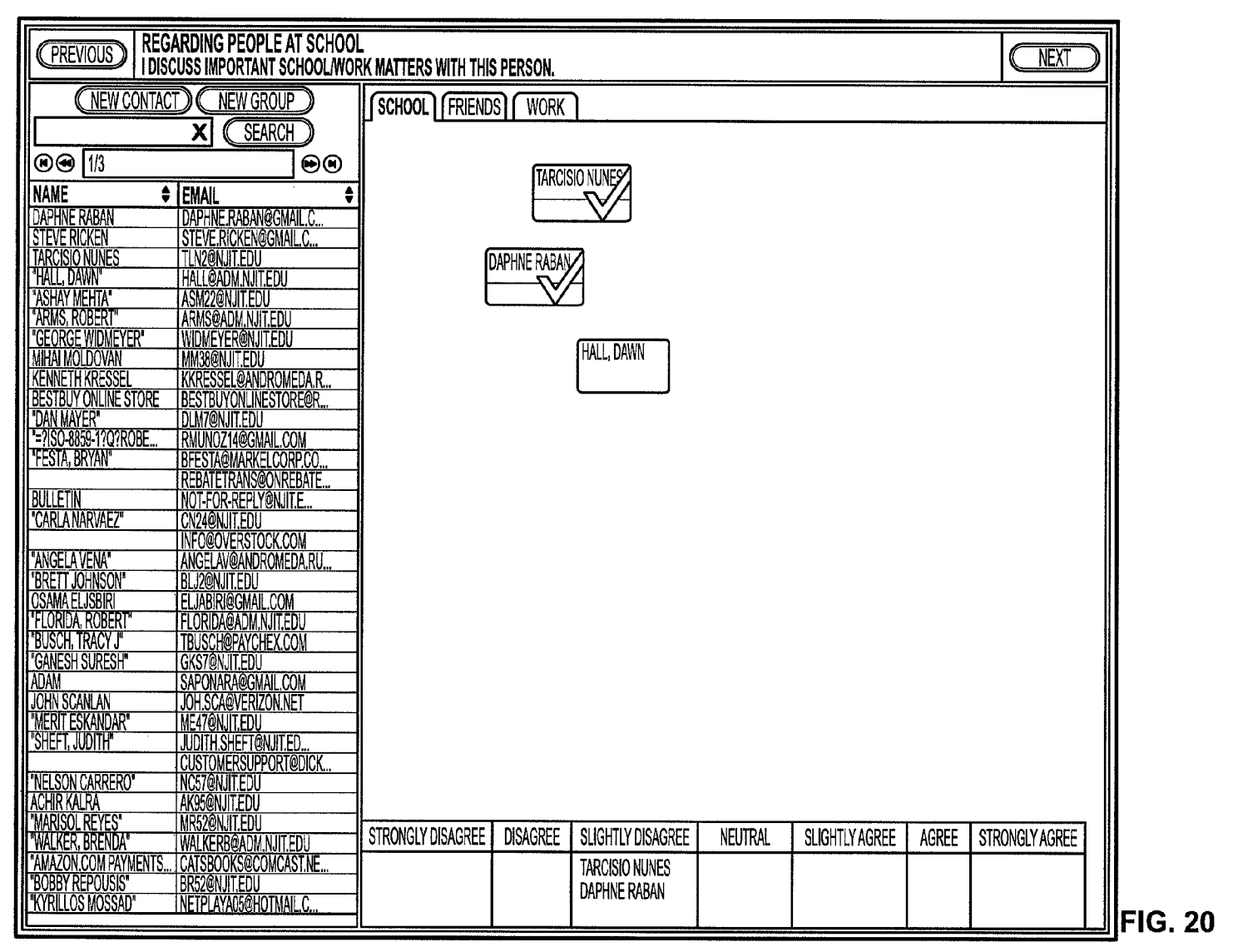
Figure 21:
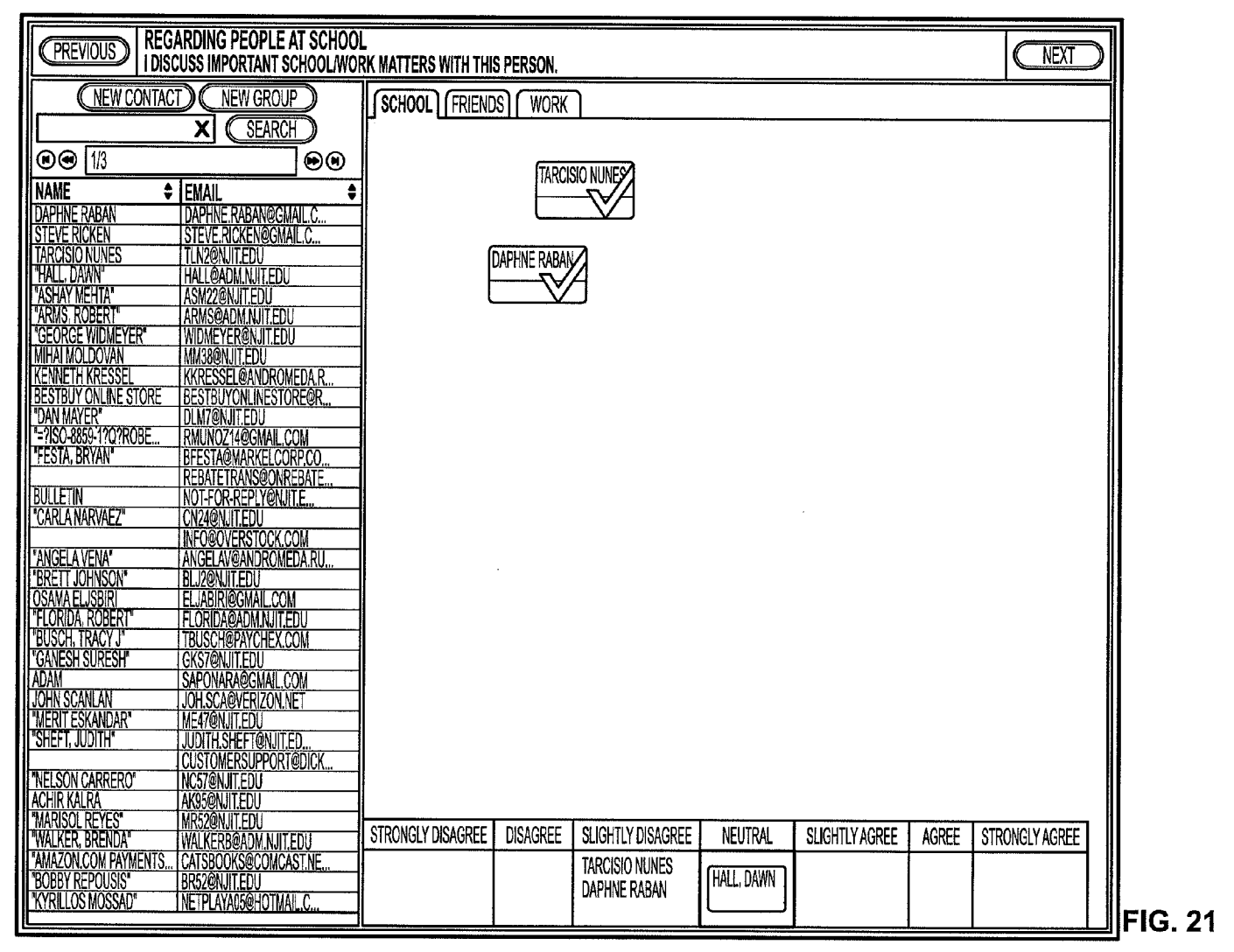
Figure 22:
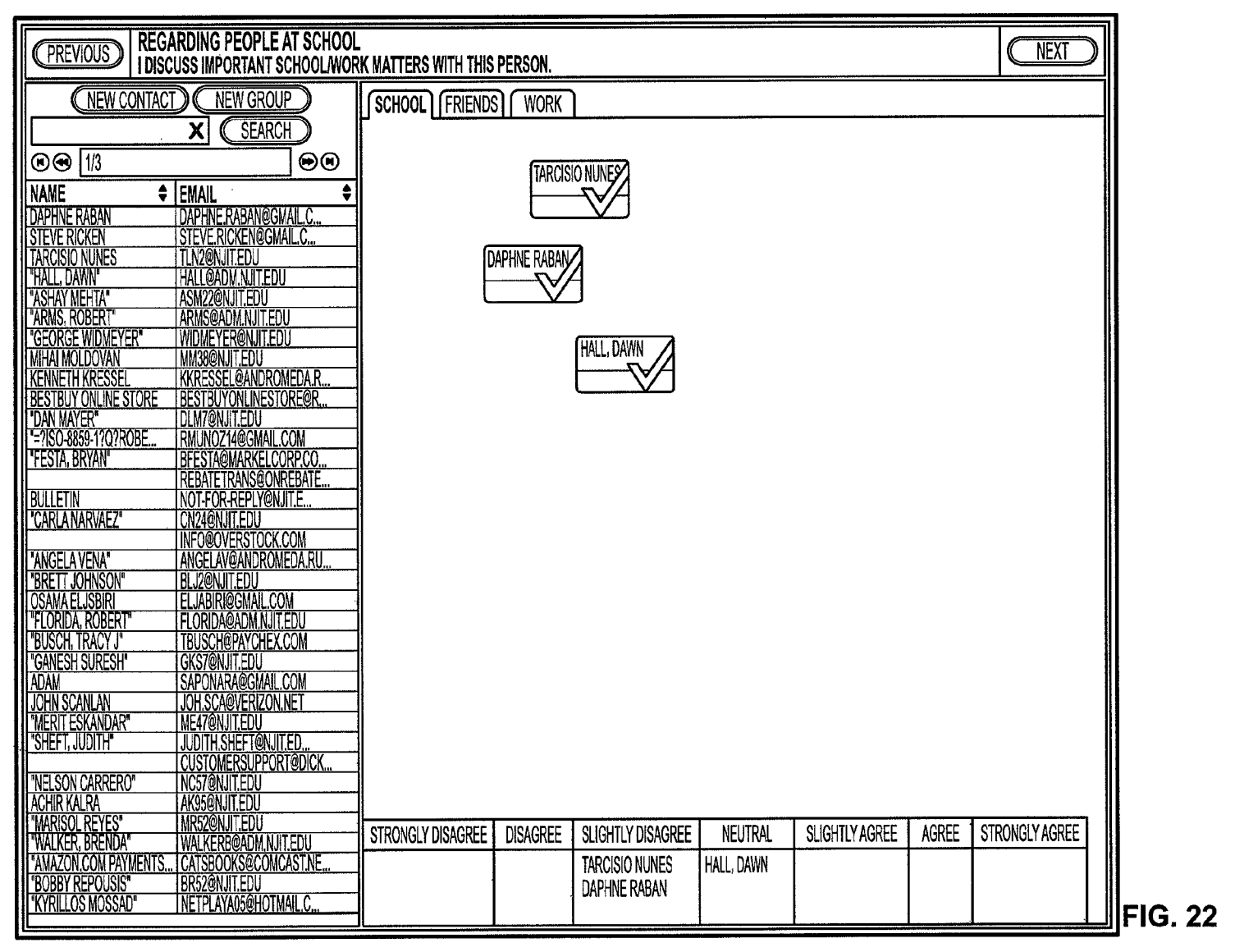

As shown in FIG. 20, the user could be provided with another question to be answered, such as to rank whether the contacts identified in response to the previous question are people with whom the user discusses important work/school matters. To answer this question, the user clicks on a contact (as shown in FIG. 20), and as shown in FIG. 21, drops the contact onto the answer bar at the bottom of the desktop, in one of the desired ranks (i.e., "Strongly Disagree," "Disagree," "Slightly Disagree," "Neutral," "Slightly Agree," "Agree," or "Strongly Agree"). As shown in FIG. 22, by dropping the contact onto the desired rank, the response is recorded by the user interface.

Figure 23:
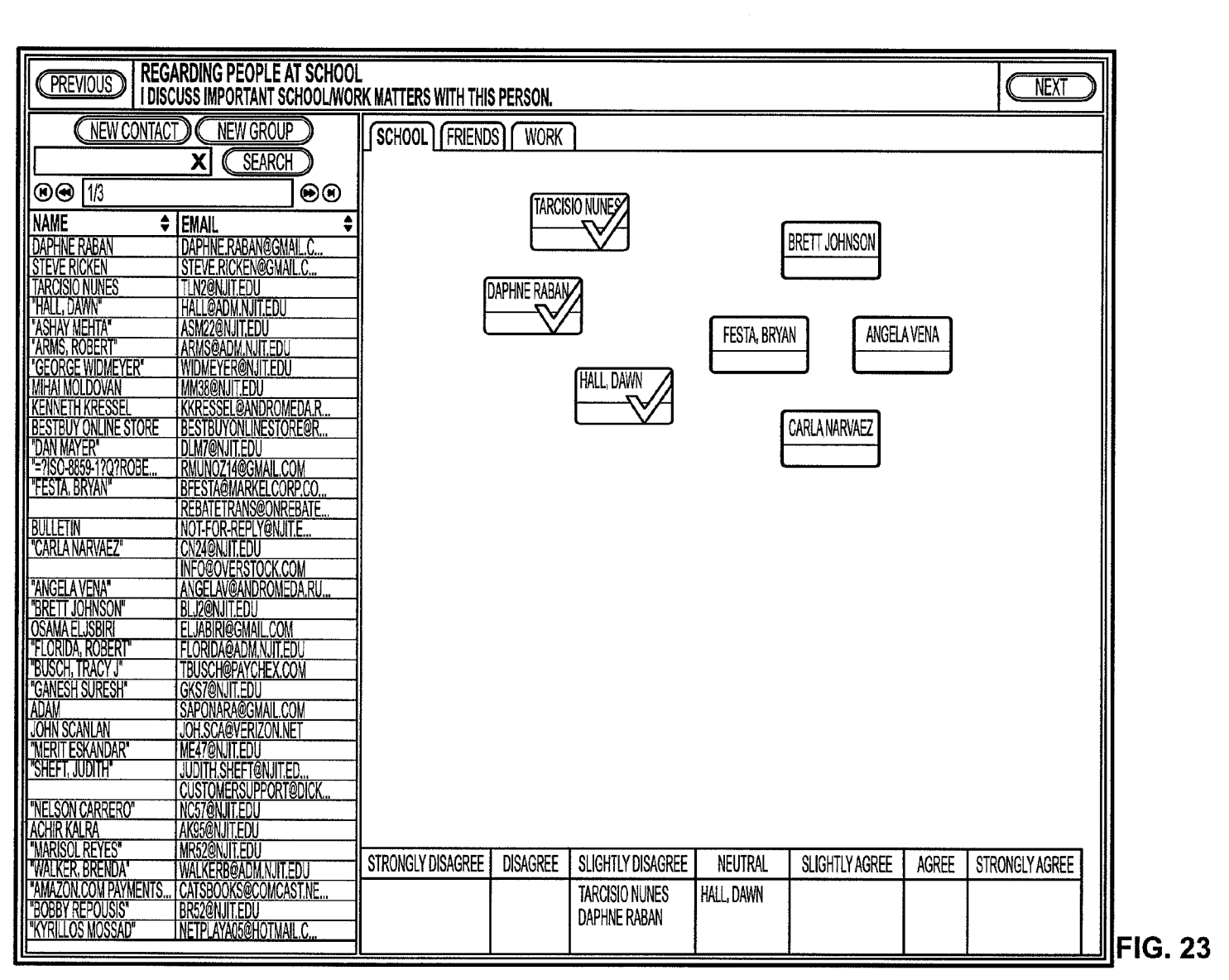
Figure 24:
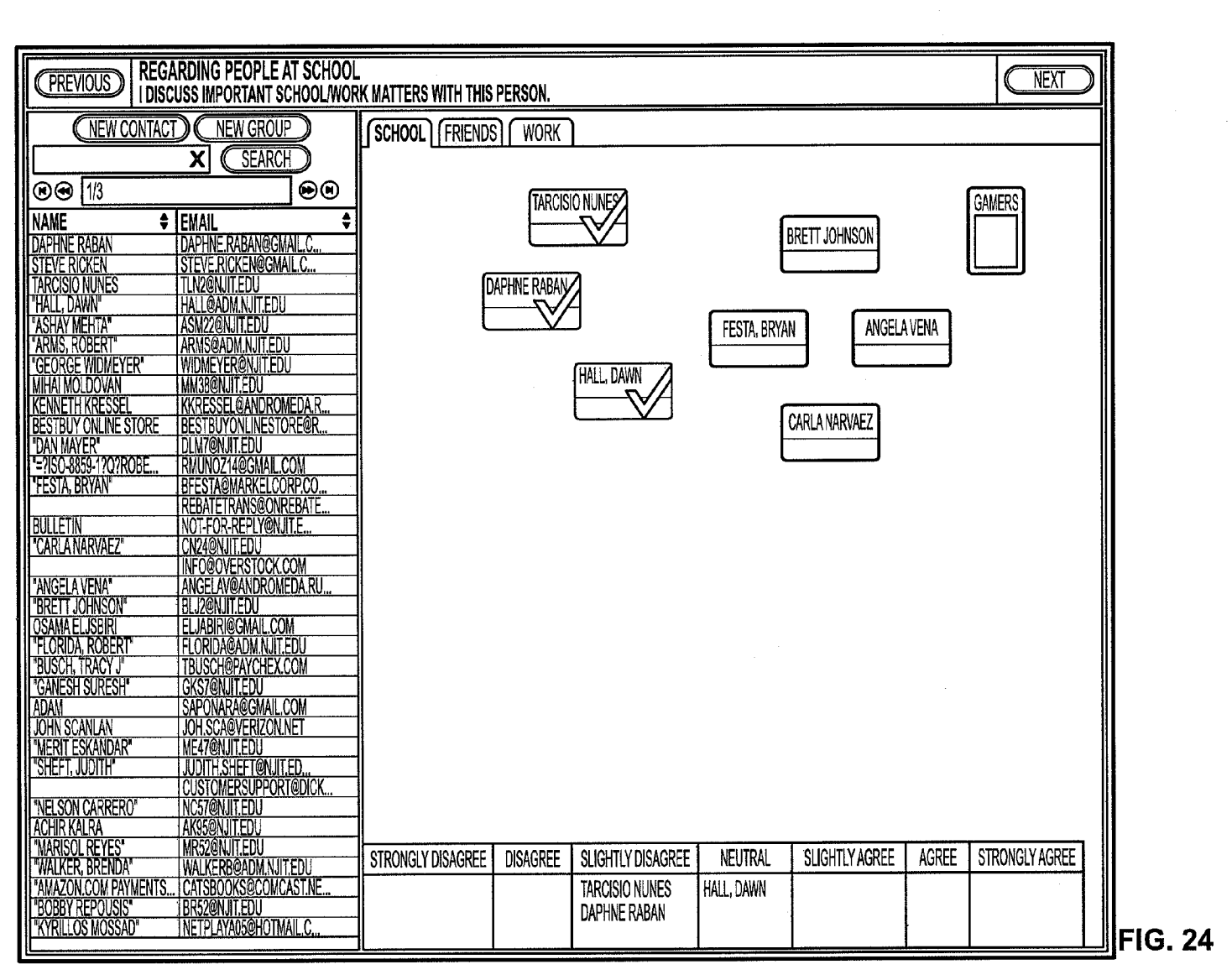
Figure 25:
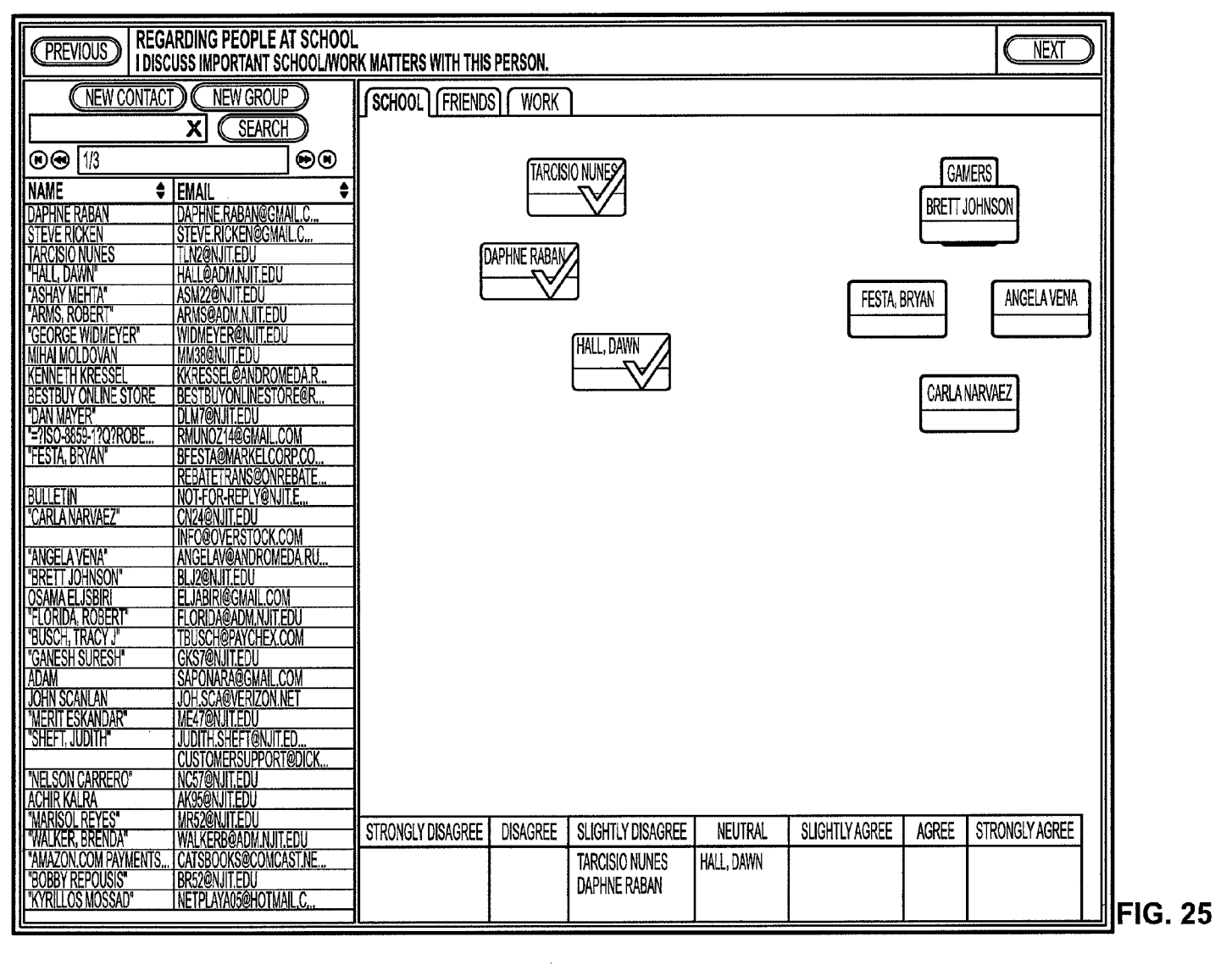
Figure 26:
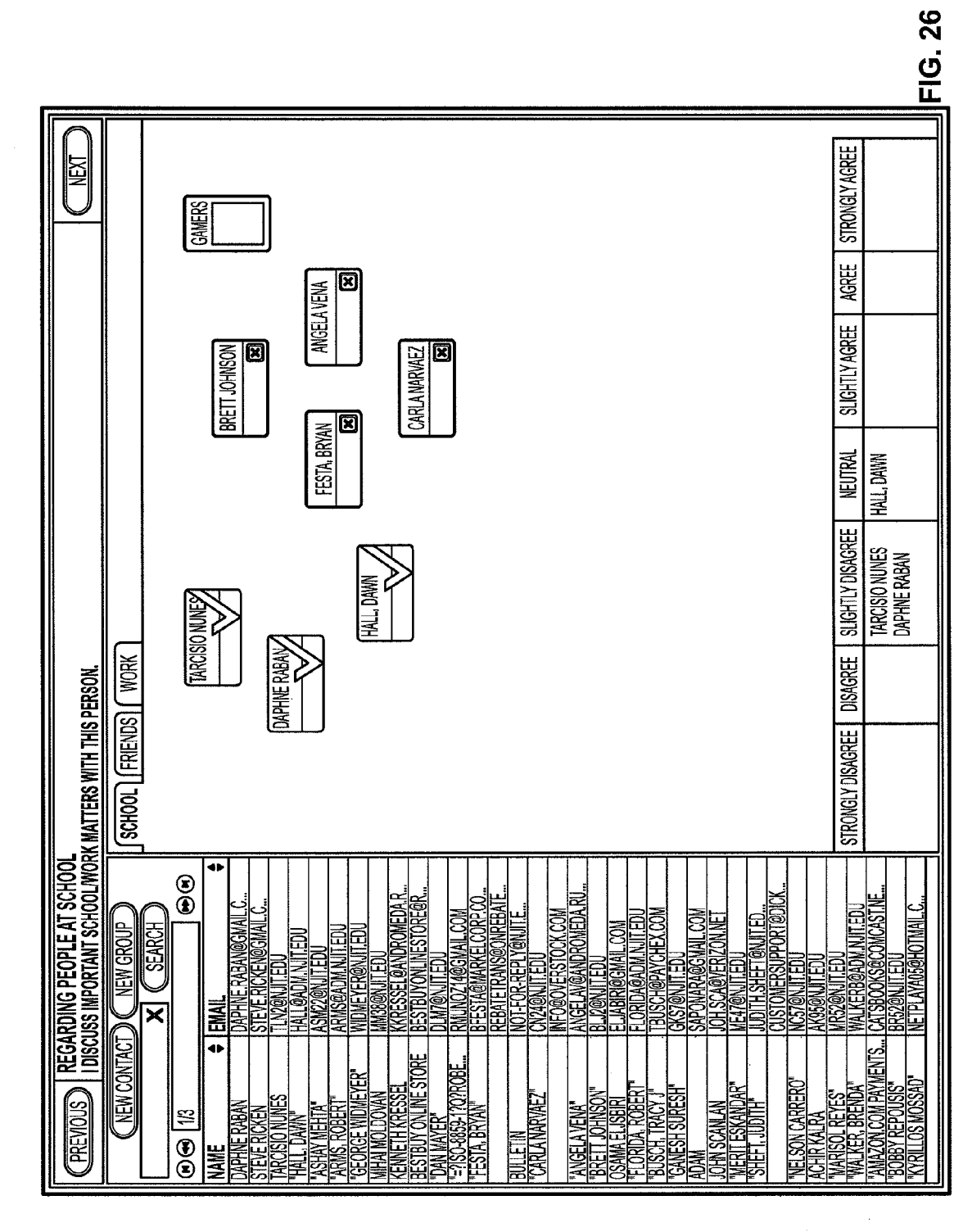

As shown in FIGS. 23-26, when a user is responding to a research question, the user can also create user-defined groups. For example, as shown in FIG. 23, the user can identify a number of additional people in response to the research question by dropping the contacts of the corresponding people on the desktop. Then, as shown in FIG. 24, the user can create a group, (such as a "Gamers" group shown in FIG. 24), and a group icon is displayed on the desktop. Then, as shown in FIG. 25, the user can move the contacts into the group by clicking on them, dragging them on top of the group, and dropping them onto the group. Finally, as shown in FIG. 26, the icons of the contacts are altered to include a visual representation that indicates that those contacts are members of the group.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present disclosure.

What is claimed is:

1. A system for facilitating user-generated content relating to social networks, comprising:
    a local computer system operated by a user;
    a central server in communication with the local computer system, the central server receiving at least one question to be posed to the user and being configured to:
        retrieve separate lists of contacts from disparate sources representing different modes of communication through which the user interacts socially;
        create a master list of contacts of the user based on the separate lists of contacts retrieved from the disparate sources;
        generate at least one user interface screen which includes the at least one question to be posed to the user and the master list of contacts, the at least one user interface screen including a plurality of answer areas;
        transmit the at least one user interface screen for display by the local computer system, the user responding to the at least one question using the at least one user interface screen by selecting a plurality of contacts from the master contact list and dropping the plurality contacts onto the plurality of answer areas associated with the at least one question;
        define a characteristic of the relationship between the user and each of the plurality of contacts based upon which of the plurality of answer areas each contact in the plurality of contacts is dropped; and
    a database for storing a social visualization of the master list of contacts;
    wherein the central server updates the social visualization of the master list of contacts stored in the database to reflect the characteristic of the relationship between the user and the plurality of contacts identified in response to the at least one question.

2. The system of claim 1, wherein the content comprises a user-defined group and the at least one user interface screen permits the user to assign one or more contacts to the group.

3. The system of claim 2, further comprising a group icon in the user interface screen corresponding to the group created by the user, the user assigning the one or more contacts to the group by clicking on the one or more contacts and dropping the one or more contacts onto the group icon.

4. The system of claim 1, wherein the content comprises a user-defined tag and the at least one user interface screen permits the user to assign the tag to the one or more contacts.

5. The system of claim 1, wherein the central server is configured to transmit the content to a contact management system external to the central server.

6. The system of claim 1, wherein the central server generates a survey screen and transmits the survey screen to the user for display to the user, the survey screen reflecting the user's answer to the at least one question and at least one other user's answer to the at least one question.

7. The system of claim 1, wherein the central server transmits the content to a researcher for subsequent analysis and social network visualization.

8. A method for facilitating user-generated content relating to social networks, comprising:
 receiving at a computer system at least one question to be posed to a user;
 retrieving separate lists of contacts from disparate sources representing different modes of communication through which the user interacts socially;
 creating at the computer system a master list of contacts of the user based on the separate lists of contacts retrieved from the disparate sources;
 generating at least one user interface screen which includes the at least one question to be posed to the user and the master list of contacts, the at least one user interface screen including a plurality of answer areas;
 displaying the at least one user interface screen to the user;
 receiving a response to the at least one question from the user via the at least one user interface screen, the response identifying a plurality of contacts from the master list of contacts based on selecting the plurality of contacts from the master contact list and dropping the plurality of contacts onto the plurality of answer areas associated with the at least one question;
 defining a further characteristic of the relationship between the user and each of the plurality of contacts based upon which of the plurality of answer areas each contact in the plurality of contacts is dropped;
 storing a social visualization of the master list of contacts in a database; and
 updating the social visualization of the master list of contacts stored in the database to reflect the further characteristic of the relationship between the user and the plurality of contacts identified in response to the at least one question.

9. The method of claim 8, wherein the step of allowing the user to generate content comprises allowing the user to create a group using the user interface and to assign one or more contacts to the group.

10. The method of claim 9, further comprising creating a group icon in the user interface screen corresponding to the group created by the user, and allowing the user to assign the one or more contacts to the group by clicking on the one or more contacts and dropping the one or more contacts onto the group icon.

11. The method of claim 8, wherein the step of allowing the user to generate content comprises allowing the user to create at least one tag using the user interface and assign one or more contacts to the at least one tag.

12. The method of claim 8, further comprising transmitting the content to a contact management system external to the central server.

13. The method of claim 8, further comprising generating a survey screen and displaying the survey screen to the user, the survey screen reflecting the user's answer to the at least one question and at least one other user's answer to the at least one question.

14. The method of claim 8, further comprising electronically transmitting the content to a researcher for subsequent analysis and social network visualization.

15. A tangible, non-transitory computer readable storage medium comprising computer-readable instructions for instructing at least one computer system to generate a computerized environment for facilitating user-generated content relating to social networks, the instructions causing the at least one computer system to execute the steps comprising:
 receiving at a computer system at least one question to be posed to a user;
 retrieving separate lists of contacts from disparate sources representing different modes of communication through which the user interacts socially;
 creating at the computer system a master list of contacts of the user based on the separate lists of contacts retrieved from the disparate sources;
 generating at least one user interface screen which includes the at least one question to be posed to the user and the master list of contacts, the at least one user interface screen including a plurality of answer areas;
 displaying the at least one user interface screen to the user;
 receiving a response to the at least one question from the user via the at least one user interface screen by, the response identifying a plurality of contacts from the master list of contacts based on selecting the plurality of contacts from the master contact list and dropping the plurality of contacts onto the plurality of answer areas associated with the at least one question;
 defining a further characteristic of the relationship between the user and each of the plurality of contacts based upon which of the plurality of answer areas each contact of the plurality of contacts is dropped;
 storing a social visualization of the master list of contacts in a database; and
 updating the social visualization of the master list of contacts stored in the database to reflect the further characteristic of the relationship between the user and the plurality of contacts identified in response to the at least one question.

16. The non-transitory computer-readable medium of claim 15, wherein the step of allowing the user to generate content further comprises allowing the user to create a group using the user interface and to assign one or more contacts to the group.

17. The non-transitory computer-readable medium of claim 16, further comprising creating a group icon in the user interface screen corresponding to the group created by the user, the user assigning the one or more contacts to the group by clicking on the one or more contacts and dropping the one or more contacts onto the group icon.

18. The non-transitory computer-readable medium of claim 15, wherein the step of allowing the user to generate content comprises allowing the user to create at least one tag using the user interface and assign one or more contacts to the at least one tag.

19. The non-transitory computer-readable medium of claim 15, further comprising transmitting the content to a contact management system external to the at least one computer system.

20. The non-transitory computer-readable medium of claim 15, further comprising generating a survey screen and displaying the survey screen to the user, the survey screen reflecting the user's answer to the at least one question and at least one other user's answer to the at least one question.

21. The non-transitory computer-readable medium of claim 15, further comprising transmitting the content to a researcher for subsequent analysis and social network visualization.

* * * * *